(12) United States Patent
Obata et al.

(10) Patent No.: US 6,574,274 B2
(45) Date of Patent: *Jun. 3, 2003

(54) PICTURE SIGNAL PROCESSING SYSTEM, DECODER, PICTURE SIGNAL PROCESSING METHOD, AND DECODING METHOD

(75) Inventors: Koji Obata, Tokyo (JP); Nobuhiro Igi, Kanagawa (JP); Motoki Kato, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/256,753

(22) Filed: Feb. 24, 1999

(65) Prior Publication Data

US 2002/0181595 A1 Dec. 5, 2002

(30) Foreign Application Priority Data

Feb. 27, 1998 (JP) .......................................... 10-047231
Feb. 27, 1998 (JP) .......................................... 10-047892

(51) Int. Cl.$^7$ ............................ H04B 1/66; H04N 7/12; G06K 9/46

(52) U.S. Cl. ............................... 375/240.03; 375/240.1; 348/416.1; 382/251

(58) Field of Search ....................... 375/240.03, 240.22, 375/240.04, 240.05, 240.24, 240.1; 348/402.1, 413.1, 416.1, 431.1; 382/107, 236, 251, 253, 232; 386/52, 111; 341/50

(56) References Cited

U.S. PATENT DOCUMENTS

| 5,754,698 | A | * | 5/1998 | Suzuki et al. ................ 382/232 |
| 5,952,943 | A | * | 9/1999 | Walsh et al. .................. 341/50 |
| 6,246,438 | B1 | * | 6/2001 | Nishikawa et al. .... 375/240.01 |
| 6,301,428 | B1 | * | 10/2001 | Linzer ................... 375/240.04 |
| 6,310,915 | B1 | * | 10/2001 | Well et al. ............. 375/240.03 |

* cited by examiner

*Primary Examiner*—Gims S. Philippe
(74) *Attorney, Agent, or Firm*—Frommer Lawrence & Haug LLP; William S. Frommer; Glenn F. Savit

(57) ABSTRACT

A picture signal processing system is disclosed, that comprises a decoder for generating the number of encoded bits and/or an average quantizing scale as representative value(s) of encoding parameters of an input encoded picture signal, decoding the input encoded picture signal, generating the decoded picture signal, and outputting the encoding parameters along with the generated decoded picture signal, and an encoder for encoding the decoded picture signal with the encoding parameters.

23 Claims, 17 Drawing Sheets

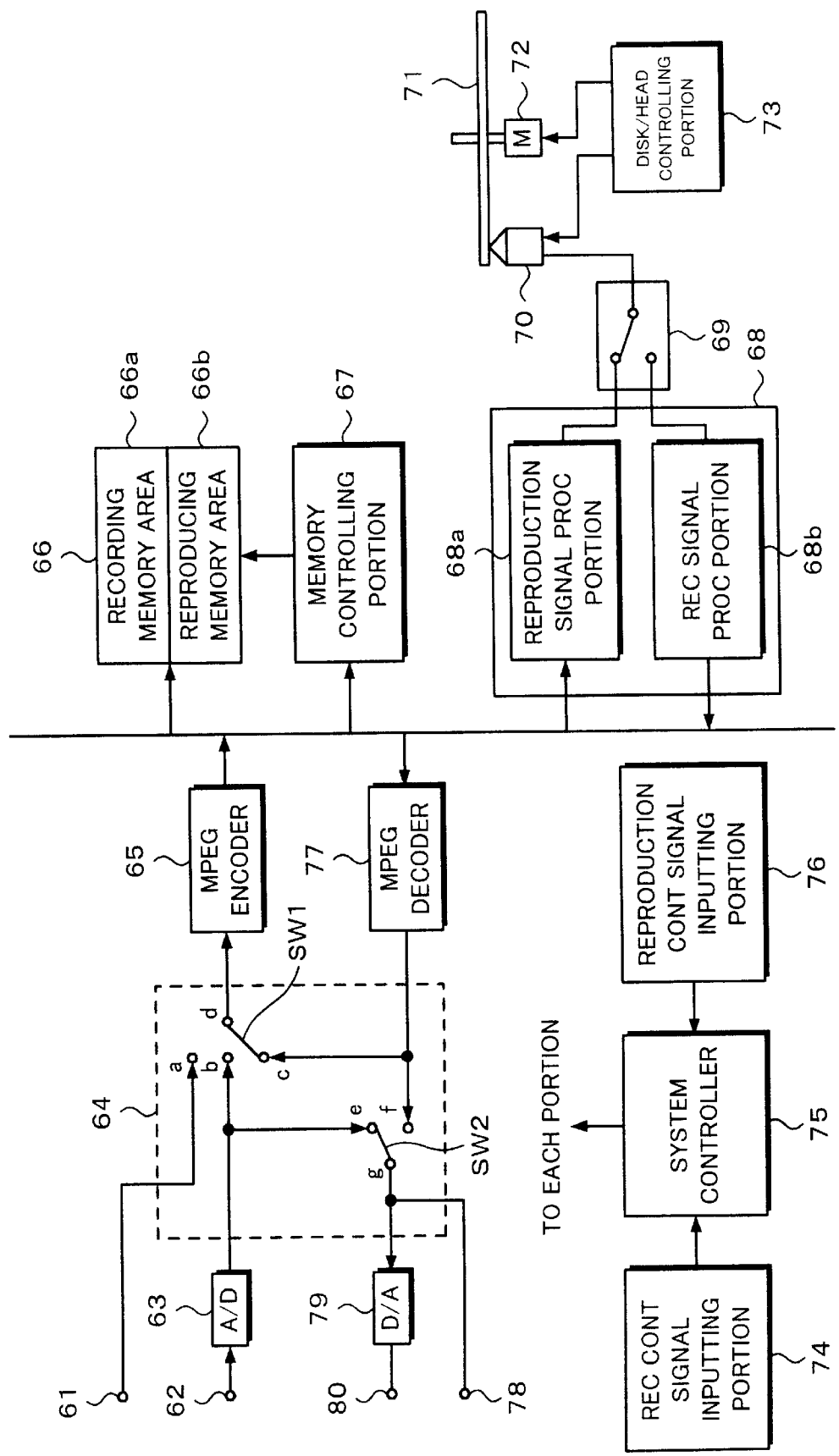

Fig. 7

| SEQUENCE NAME | CONVENTIONAL RE-ENCODING PROCESS : ONLY PICTURE TYPE AND MOVING VECTOR, SNR [dB] | RE-ENCODING PROCESS ACCORDING TO PRESENT INVENTION : PICTURE TYPE, MOVING VECTOR, AND NUMBER OF ENCODED BITS, SNR [dB] |
|---|---|---|
| bus | 35.28 | 35.48 |
| bicycles | 30.59 | 31.40 |
| mobile&calender | 31.16 | 31.74 |
| flowergarden | 34.21 | 34.56 |
| cheerleader | 32.55 | 33.23 |

Fig. 8

| SEQUENCE NAME | CONVENTIONAL RE-ENCODING PROCESS : ONLY PICTURE TYPE, SNR [dB] | RE-ENCODING PROCESS ACCORDING TO PRESENT INVENTION : PICTURE TYPE AND NUMBER OF ENCODED BITS, SNR [dB] |
|---|---|---|
| bus | 35.09 | 35.14 |
| bicycles | 30.38 | 30.78 |
| mobile&calender | 31.05 | 31.51 |
| flowergarden | 34.06 | 34.26 |
| cheerleader | 32.34 | 32.76 |

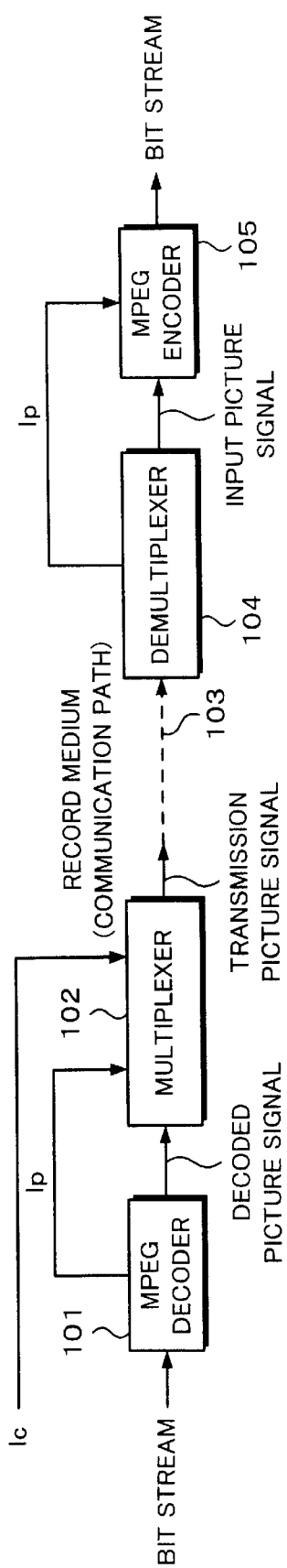
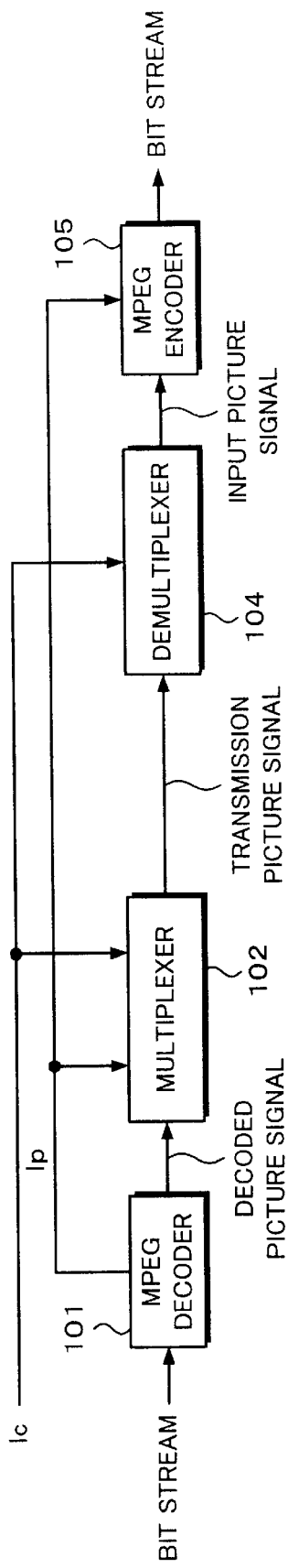

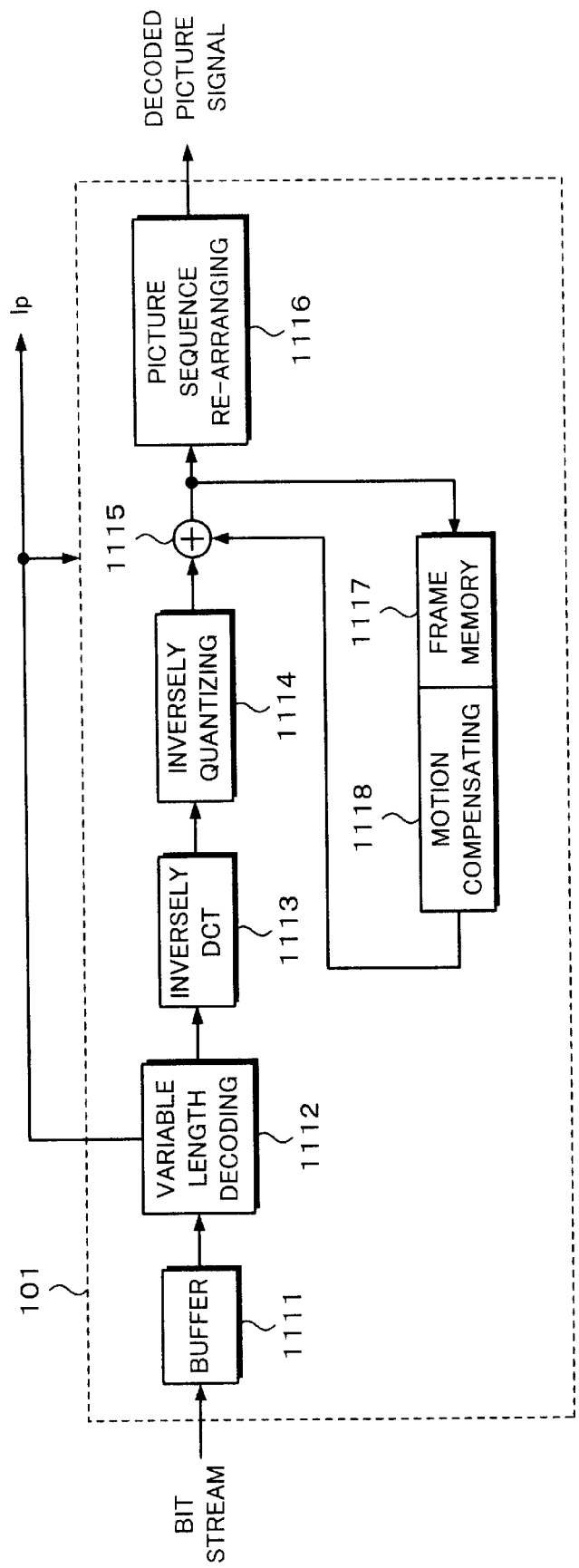

Fig. 13A  INPUT TO DECODER
Fig. 13B  OUTPUT FROM DECODER
Fig. 13C  INPUT TO ENCODER
Fig. 13D  OUTPUT FROM ENCODER

Fig. 14A  INPUT TO DECODER

| I2 | B0 | B1 | P5 | B3 | B4 | P8 | B6 | B7 | P11 | B9 | B10 |

Fig. 14B  OUTPUT FROM DECODER

| B0 | B1 | I2 | B3 | B4 | P5 | B6 | B7 | P8 | B9 | B10 | P11 |

Fig. 14C  INPUT TO ENCODER

| B0 | B1 | I2 | B3 | B4 | P5 | B6 | B7 | P8 | B9 | B10 | P11 |

Fig. 14D  OUTPUT FROM ENCODER

| I2 | B0 | B1 | P5 | B3 | B4 | P8 | B6 | B7 | P11 | B9 | B10 |

DL

480 LINES
(top_field AND bottom_field :
240 LINES EACH)

720 PIXELS

▨ top_field
☐ bottom_field

VERTICAL BLANKING
HORIZONTAL BLANKING
525 LINES
EFFECTIVE PIXELS
(PIXELS AREA OF MPEG
DECODED PICTURE)
480 LINES
720
START POSITION OF PIXELS OF MPEG DECODED PICTURE

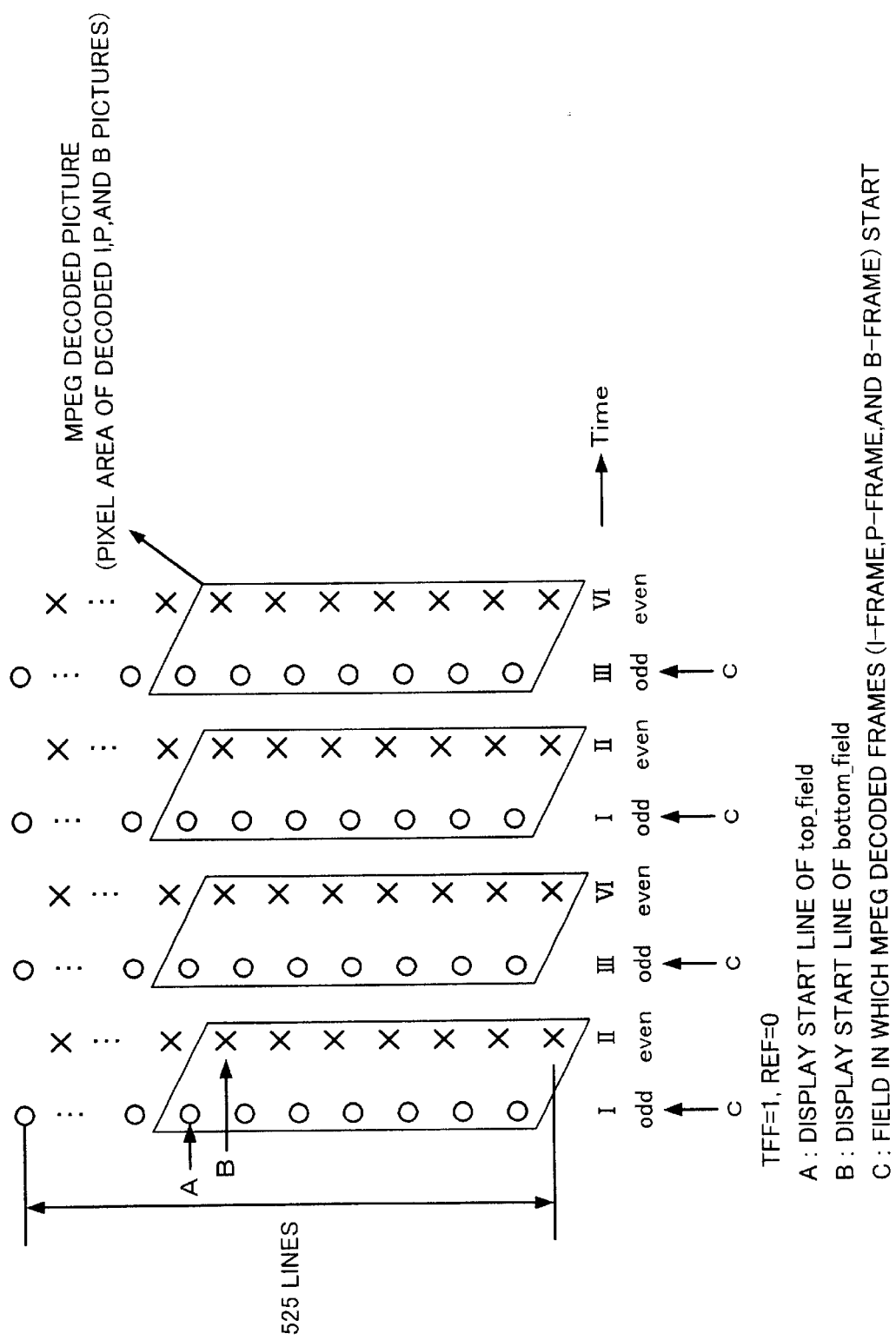

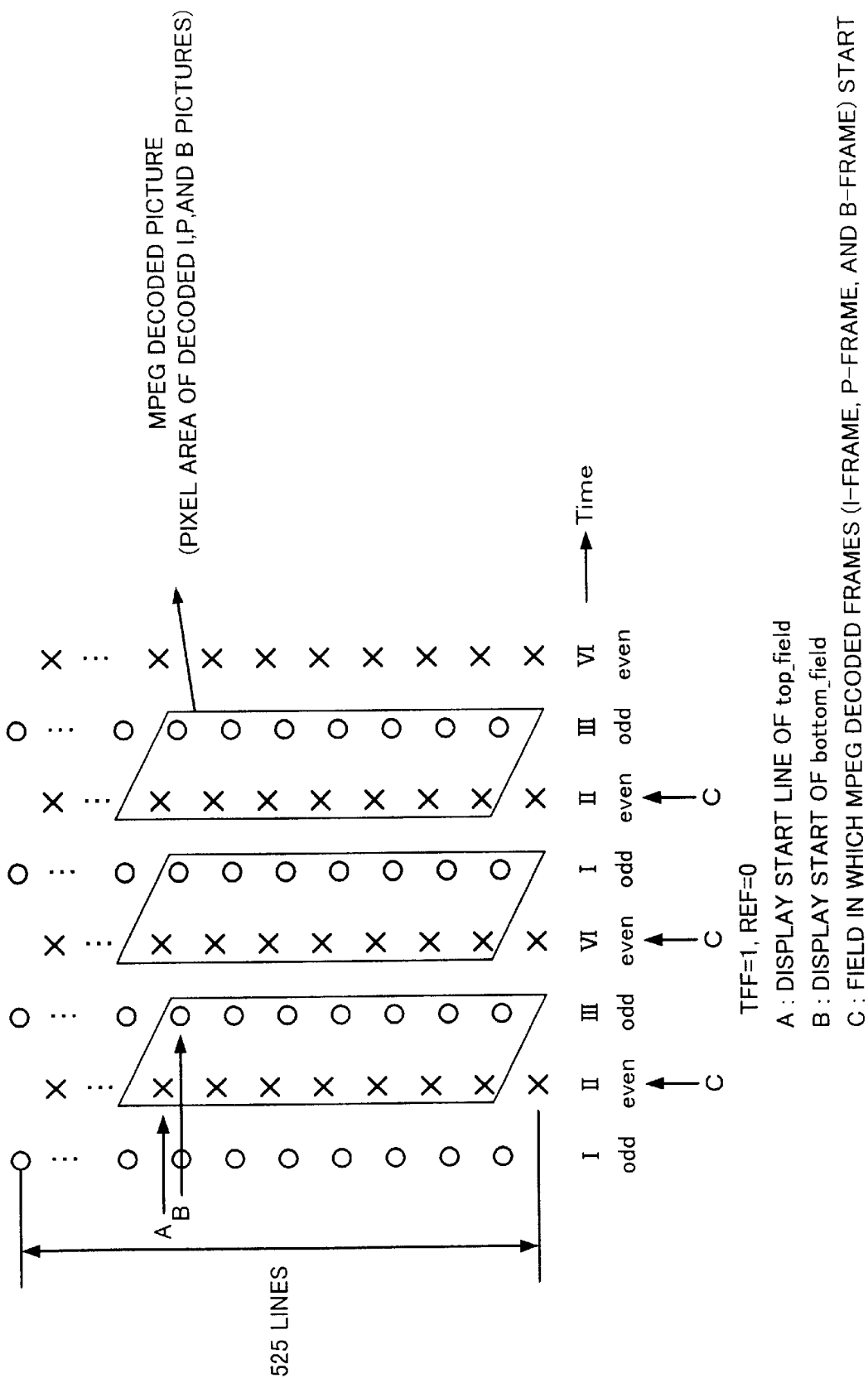

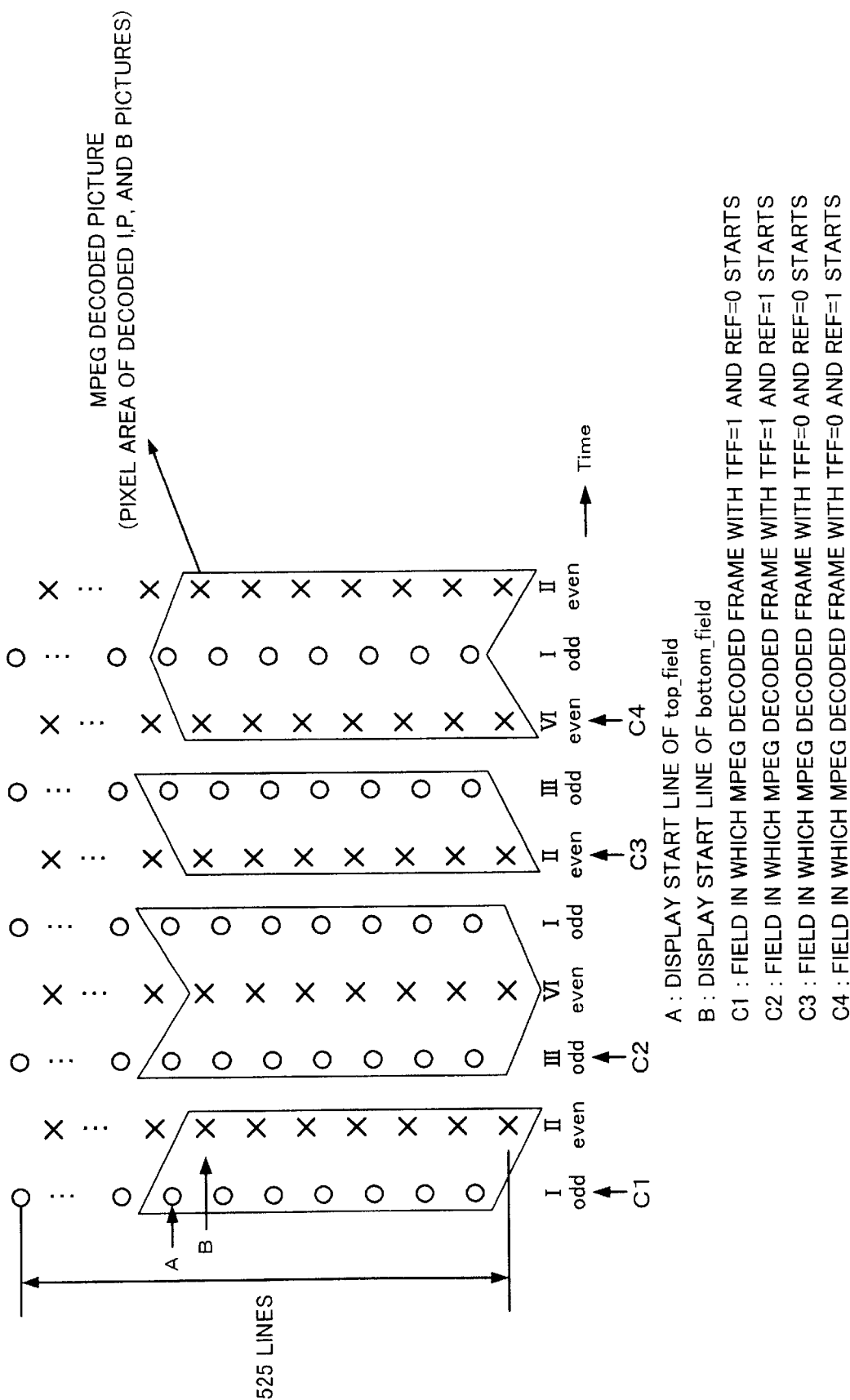

PICTURE SIGNAL PROCESSING SYSTEM, DECODER, PICTURE SIGNAL PROCESSING METHOD, AND DECODING METHOD

BACKGROUND OF THE INVENTION

1. Field of the Invention

The present invention relates to a picture signal processing system, a decoder, a picture signal processing method, and a decoding method suitable for an application that requires high picture quality. In addition, the present invention relates to a picture signal decoding method, a decoding apparatus, a picture signal encoding method, an encoding apparatus, a picture signal processing method, and a processing system for decoding a picture signal that has been compression-encoded by for example MPEG encoding method and encoding the decoded signal.

2. Description of the Related Art

In recent years, the MPEG (Moving Picture Experts Group) encoding method, which is an inter-picture compression encoding method, has been widely used. With the compression-encoding method such as the MPEG encoding method, a record medium can be effectively used. In an editing process for a picture signal that has been encoded by the MPEG encoding method, when a picture signal that has been encoded is decoded and then the decoded picture is re-encoded, the picture quality sometimes deteriorates more than that of a normal encoding process for a video signal. As a cause of such deterioration, encoding parameters such as a picture type and a moving vector of a picture signal encoded by the MPEG encoding method do not match those of a picture signal re-encoded by the MPEG encoding method.

Next, with reference to FIGS. 9A, 9B, and 9C, the case where a picture type of a picture signal that is encoded does not match that of a picture signal that is re-encoded will be described. FIG. 9A shows an example of picture types of input decoded pictures of one GOP (Group Of Pictures) (n=15) where the input decoded pictures are re-encoded. When the phases of picture types are locked as shown in FIG. 9B, as a reference picture for a re-encoding process, an I picture of the input decoded picture shown in FIG. 9A is used as is.

On the other hand, when the phases of picture types are not locked as in the case shown in FIG. 9C, as with the third picture, a B picture whose picture quality largely deteriorates is used as a reference picture. As a result, the accuracy of the re-encoding process deteriorates. Thus, the picture quality largely deteriorates.

Likewise, when another encoding parameter such as a moving vector of a picture signal that is encoded does not match that of a picture signal that is re-encoded, the predictive accuracy deteriorates. Thus, the accuracy of the re-encoding process deteriorates.

On the other hand, when all encoding parameters including a picture type and a moving vector of a picture signal that is encoded are matched with those of a picture signal that is re-encoded, the picture quality hardly deteriorates. However, as the number of encoding parameters increases, the amount of information to be processed increases. Consequently, it is not practical to perform a process for matching all encoding parameters of a picture signal that is encoded with those of a picture signal that is re-encoded. It is known that when a picture type and a moving vector of a picture signal that is encoded are matched with those of a picture signal that is re-encoded, the deterioration of the picture quality can be remarkably suppressed.

However, when high picture quality is required, even if a picture type and a moving vector of a picture signal that is encoded are matched with those of a picture signal that is re-encoded, the deterioration of the picture quality cannot be sufficiently suppressed.

A moving vector represents information of motion of each macro block. Thus, the amount of information of a moving vector is relatively large. Consequently, from a view point of the improvement of the re-encoding process, an encoding parameter that has a smaller amount of information than that of a moving vector and that effectively suppresses the deterioration of the picture quality is required in the case that the structure for matching a moving vector of a picture signal that is encoded is matched with that of a picture signal that is re-encoded cannot be used.

In a system using the MPEG encoding method, an MPEG encoded stream is decoded. The resultant picture signal is converted into a format of a transmission picture signal such as an NTS format. The resultant picture signal is transmitted through a digital VCR or the like and re-encoded by the MPEG encoding method. In another editing system, a picture signal that has been reproduced from a record medium and decoded is combined with an external picture signal. The resultant picture signal is encoded by the MPEG encoding method. The resultant stream is recorded on a record medium. In a dubbing process for recording a video signal recorded on a first record medium to a second record medium by a recorder, a signal of the first record medium is decoded and then re-encoded.

In such examples, when a decoded picture signal is re-encoded, it is preferred to match a picture encoding type of a stream that is re-encoded (an output signal of an encoder) with that of a stream that is encoded (an input signal of a decoder) so as to improve the picture quality of a stream that has been re-encoded and then decoded. In the MPEG encoding method, there are three picture types I, P, and B.

In an I picture (Intra-coded picture), when a picture signal is encoded, information of only one picture is used. Thus, when an encoded picture signal is decoded, information of only the I picture is used. In a P picture (Predictive-coded picture), as a predictive picture (a reference picture for obtaining a difference with the current P picture), an I picture or another P picture that has been decoded is temporally followed by the current P picture. The difference between the current P picture and a motion-compensated predictive picture is encoded for each macro block. Alternatively, the current P picture is encoded for each macro block without obtaining the difference of such pictures. One of those methods is selected whichever higher efficiency is obtained. In a B picture (Bidirectionally predictive-coded picture), as predictive pictures (reference pictures for obtaining a difference with the current B picture), three types of reference pictures are used. The first type reference picture is an I picture or a P picture that has been decoded and that is temporally followed by the current B picture. The second type reference picture is an I picture or a P picture that has been decoded and that is temporally preceded by the current B picture. The third type reference picture is an interpolated picture of the first type reference picture and the second type reference picture. The difference between the current B picture and each of the three type reference pictures that have been motion-compensated is encoded for each macro block. Alternatively, the current B picture is encoded for each macro block without obtaining such a difference. One of those methods is selected whichever higher efficiency is obtained.

Thus, there are a frame intra-coded macro block, a forward inter-frame predictive macro frame (a future macro block is predicted with a past macro block), a backward inter-frame predictive macro block (a past macro block is predicted with a future macro block), and an interpolative macro block (a current macro block is predicted with both a future macro block and a past macro block). All macro blocks in an I picture are intra-frame coded macro blocks. A P picture contains intra-frame coded macro blocks and forward inter-frame predictive macro blocks. A B picture contains the above-described four types of macro blocks.

Generally, the picture quality of a decoded picture of an I picture or a P picture is worse than the picture quality of a decoded picture of a B picture. When a picture is re-encoded, if a decoded picture of a B picture is substituted with an I picture or a P picture and then a B picture is generated, the picture quality of the resultant B picture deteriorates. Thus, when the picture encoding type of a picture that is re-encoded is matched with that of a picture that is encoded, the deterioration of the picture quality in the decoding process and the re-encoding process can be suppressed. To suppress the deterioration of the picture quality, information of a moving vector, a quantizing scale, and so forth (referred to as codic information) that is used in the decoding process is stored. It is preferred to use the codic information in the re-encoding process.

Generally, a decoded picture is converted into a format of a transmission picture signal such as NTSC format and then supplied to an encoder that performs a re-encoding process. Thus, the encoder extracts a decoded picture (an original MPEG encoded area) from the transmission picture signal and re-encodes a decoded picture of which one frame is composed of two fields. The transmission picture signal contains non-decoded-picture information such as a blanking interval and header information. The spatial and temporal positions of decoded pictures in the transmission picture signal are not fixed. In this case, the decoded pictures represent pictures decoded from the original bit stream.

The spatial positions of decoded pictures depend on for example an application format. Depending on whether a transmission picture signal is received from a DVD, an IRD (Integrated Receiver/Decoder), a digital VCR, and so forth, the start line position in the vertical direction and the start position in the horizontal direction of the transmission picture signal vary. In addition, depending on a format, only 352 pixels×240 lines may be used as an effective area in 720 pixels×480 lines. In the MPEG encoding method, the relation between odd/even cycles in which fields of a transmission picture signal are transmitted and top/bottom fields of a decoded picture in the temporal direction has not been defined.

Thus, when a picture is extracted and re-encoded, an incorrect area may be extracted from the original decoded picture. When one frame is formed with two fields, a combination different from the original combination may be used. Consequently, even if the same picture encoding types are matched, the deterioration of the picture quality cannot be sufficiently suppressed. In addition, when a picture signal is re-encoded, the boundary of a macro block varies from that of the original bit stream. Thus, even if the codic information is re-used, the deterioration of the picture quality cannot be sufficiently suppressed.

OBJECTS AND SUMMARY OF THE INVENTION

Therefore, an object of the present invention is to provide a picture signal processing system, a decoder, a picture signal processing method, and a decoding method that sufficiently suppress the deterioration of picture quality and that allow the amount of transmission information to be small.

A first aspect of the present invention is a picture signal processing system, comprising a decoder for generating the number of encoded bits and/or an average quantizing scale as representative value(s) of encoding parameters of an input encoded picture signal, decoding the input encoded picture signal, generating the decoded picture signal, and outputting the encoding parameters along with the generated decoded picture signal, and an encoder for encoding the decoded picture signal with the encoding parameters.

A second aspect of the present invention is a picture signal processing system, comprising a decoder for decoding an input encoded picture signal, generating a decoded picture signal, superimposing encoding parameters of the encoded picture signal to a signal portion corresponding to an invalid interval of a signal format of the decoded picture signal, and outputting the encoding parameters along with the decoded picture signal, and an encoder for encoding the decoded picture signal with the encoding parameters.

A third aspect of the present invention is a decoder, comprising an encoding parameter generating means for generating the number of encoded bits and/or an average quantizing scale as representative value(s) of encoding parameters of an input encoded picture signal, and a decoding means for decoding the input encoded picture signal and generating the decoded picture signal, wherein the encoding parameters generated by the encoding parameter generating means are output along with the generated decoded picture signal generated by the decoding means.

A fourth aspect of the present invention is a decoder, comprising a decoding means for decoding an input encoded picture signal and generating a decoded picture signal, an outputting means for superimposing encoding parameters of the input encoded picture signal to a signal portion corresponding to an invalid interval of a signal format for transmitting the decoded picture signal generated by the decoding means and outputting the encoding parameters along with the decoded picture signal.

A fifth aspect of the present invention is a picture signal processing method, comprising the steps of generating the number of encoded bits and/or an average quantizing scale as representative value(s) of encoding parameters of an input encoded picture signal, decoding the input encoded picture signal and generating the decoded picture signal, outputting the encoding parameters along with the generated decoded picture signal, and encoding the decoded picture signal with the encoding parameters.

A sixth aspect of the present invention is a picture signal processing method, comprising the steps of decoding an input encoded picture signal and generating a decoded picture signal, superimposing encoding parameters of the input encoded picture signal to a signal portion corresponding to an invalid interval of a signal format for transmitting the generated decoded picture signal and outputting the encoding parameters along with the decoded picture signal, and encoding the decoded picture signal with the encoding parameters.

A seventh aspect of the present invention is a decoding method, comprising the steps of generating the number of encoding bits and/or an average quantizing scale as representative values of encoding parameters of an input encoded picture signal, decoding the input encoded picture signal and generating a decoded picture signal, and outputting the encoding parameters along with the decoded picture signal.

An eighth aspect of the present invention is a decoding method, comprising the steps of decoding an input encoded picture signal and generating a decoded picture signal, and superimposing encoding parameters of the input encoded picture signal to a signal portion corresponding to an invalid interval of a signal format for transmitting the generated decoded picture signal and outputting the encoding parameters along with the decoded picture signal.

A ninth aspect of the present invention is a picture signal decoding method for decoding data that has been encoded by an inter-picture predictive encoding process, comprising the steps of decoding the data that has been encoded by the inter-picture predictive decoding process, converting the decoded picture signal into a transmission picture signal, and outputting control information along with the transmission picture signal, wherein the control information is composed of an indicator of a display start field of the decoded picture and a display start line of the decoded picture, and wherein the control information is superimposed with the transmission picture signal or output to a signal line different from a signal line for the transmission picture signal.

A tenth aspect of the present invention is a picture signal encoding method for encoding a decoded picture of data that has been encoded by an inter-picture predictive encoding method, comprising the steps of receiving control information composed of a transmission picture signal, an indicator, and data, the transmission picture signal being composed of a decoded picture, the indicator representing a display start field of the decoded picture, the data representing a display start line of the decoded picture, forming an encoding target area of the transmission picture signal with the control information, and performing the inter-picture predictive encoding process for the encoding target area.

An eleventh aspect of the present invention is a picture signal processing method for decoding data that has been encoded by an inter-picture predictive encoding process and encoding the decoded data, comprising the steps of decoding the data that has been encoded by the inter-picture predictive encoding process, converting the decoded picture signal into a transmission picture signal, outputting control signal along with a transmission picture signal, the control signal being composed of an indicator and data, the indicator representing a display start field of the decoded picture, the data representing a display start line of the decoded picture, receiving the transmission picture signal and the control information, forming an encoding target area of the transmission picture signal with the control information, and performing the inter-picture predictive encoding process for the encoding target area.

A twelfth aspect of the present invention is a decoding apparatus for decoding data that has been encoded by an inter-picture predictive encoding method, comprising a decoder for decoding the data that has been encoded by the inter-picture predictive encoding process, and a means for converting the decoded picture signal into a transmission picture signal and outputting control signal along with a transmission picture signal, wherein the control signal is composed of an indicator and data, the indicator representing a display start field of the decoded picture, the data representing a display start line of the decoded picture.

A thirteenth aspect of the present invention is a picture signal encoding method for encoding a decoded picture of data that has been encoded by an inter-picture predictive encoding process, comprising the steps of receiving control information composed of a transmission picture signal, an indicator, and data, the transmission picture signal being composed of the decoded picture, the indicator representing a display start field of the decoded picture, the data representing a display start line of the decoded picture, forming an encoding target area for the transmission picture signal, and performing the inter-picture predictive encoding process for the encoding target area.

A fourteenth aspect of the present invention is a picture signal processing system for decoding data that has been encoded by an inter-picture predictive encoding process and encoding the decoded data, comprising a decoder for decoding the data that has been encoded by the inter-picture predictive encoding process, a means for converting the decoded picture signal into a transmission picture signal and outputting control information along with the transmission picture signal, the control information being composed of an indicator and data, the indicator representing a display start field of the decoded picture, the data representing a display start line of the decoded picture, a means for forming an encoding target area of the transmission picture signal with the control information, and performing an inter-picture predicting encoding process for the encoding target area.

According to the present invention, an encoding parameter that is used in a first picture encoding process is supplied to an encoder that performs a re-encoding process. Thus, with the same encoding parameter used in the first inter-picture compression-encoding process, the re-encoding process can be performed.

In particular, when the number of encoded bits, an average quantizing scale, and so forth used in the first encoding process are supplied to the encoder that performs the re-encoding process, the number of encoded bits in the first encoding process can be matched with that in the re-encoding process.

In addition, according to the present invention, when a decoded picture is converted into a transmission picture signal and the transmission picture signal is re-encoded, temporal information and spatial information of the decoded picture are supplied as control information to the re-encoder. Thus, the re-encoder can re-encode the decoded picture with the same temporal and spatial relations with the original bit stream. Consequently, the deterioration of the picture quality in the decoding process and the re-encoding process can be effectively suppressed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 6 is a block diagram for explaining a picture signal processing system according to the present invention;

FIG. 7 is a table for explaining an example of the effects of the present invention;

FIG. 8 is a table for explaining another example of the effects of the present invention;

FIGS. 9A, 9B, and 9C are schematic diagrams for explaining a problem that takes place in the case that a picture type in a first encoding process does not match that in a re-encoding process;

FIGS. 10A and 10B are block diagrams showing the structures of another embodiment of the present invention and a modification thereof;

FIG. 11 is a block diagram showing an example of the structure of an MPEG decoder according to another embodiment of the present invention;

FIGS. 13A, 13B, 13C, and 13D are timing charts showing examples of input and output signals of a decoder and an encoder;

FIGS. 14A, 14B, 14C, and 14D are timing charts showing other examples of input and output signals of a decoder and an encoder;

FIG. 19 is a schematic diagram showing an example of a temporal relation between an MPEG decoded picture and a transmission picture format;

FIG. 20 is a schematic diagram showing another example of a temporal relation between an MPEG decoded picture and a transmission picture format; and FIG. 21 is a schematic diagram showing a further example of a temporal relation between an MPEG decoded picture and a transmission picture format.

DETAILED DESCRIPTION OF THE PREFERRED EMBODIMENTS

Figure 1:
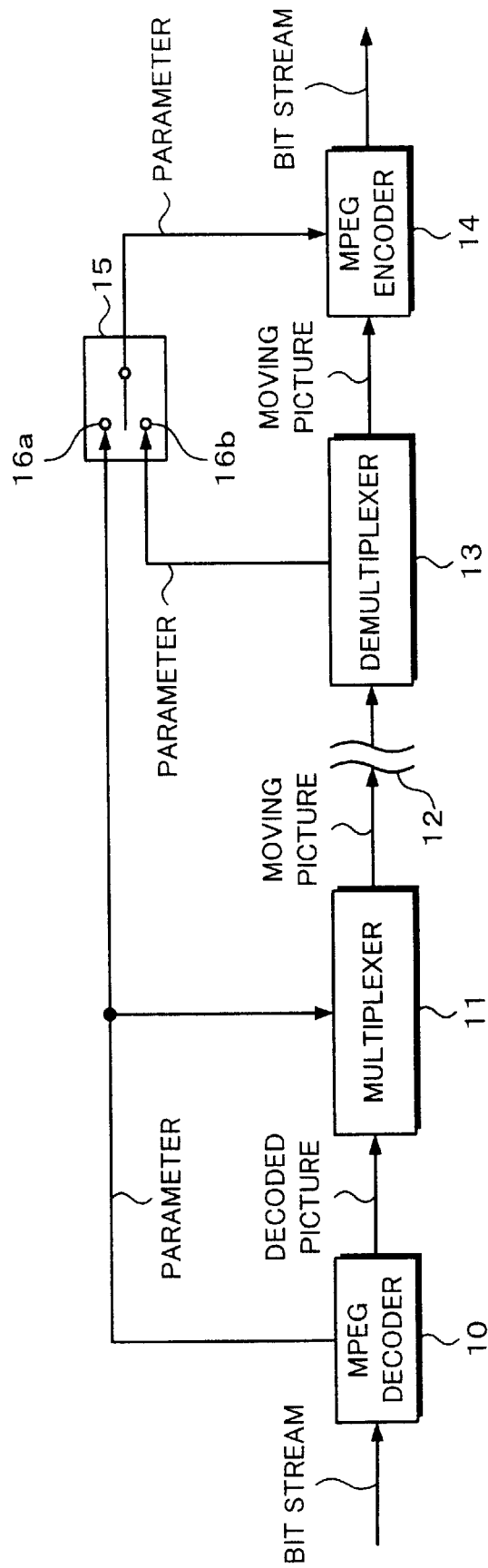
FIG. 1 is a block diagram for explaining an embodiment of the present invention.

Next, with reference to the accompanying drawings, embodiments of the present invention will be described.

First of all, a fundamental concept of the present invention will be described. Experimental results for influence of various encoding parameters against the deterioration of picture quality show that the difference between the number of encoded bits in a first encoding process and that in a re-encoding process is a factor that causes the picture quality to deteriorate. As a cause of such a difference, the rate control in the first encoding process is different from the rate control in the re-encoding process.

For example, in a feed-forward rate controlling process, the rate control is performed corresponding to the complexity of a picture. In this case, when a picture that has been encoded by the MPEG encoding method is decoded, the amount of information of a B picture is smaller than the amount of information of an I picture or a P picture in the first encoding process. Thus, it is determined that the encoding difficulty ("difficultness") (a parameter that represents the easiness of the compression) of a B picture is low. When the picture type of a picture signal in the first encoding process is matched with that in the re-encoding process, the number of bits of the B picture is decreased. Thus, the picture quality deteriorates.

Consequently, as will be described later, when the number of encoded bits in the first encoding process is matched with that in the re-encoding process, the deterioration of the picture quality can be suppressed. Further studies reveal that the method for matching the number of encoded bits in the first encoding process with that in the re-encoding process is effective in the case that the picture types thereof are matched and that the moving vectors thereof are not matched.

To match the number of encoded bits in the first encoding process with that in the re-encoding process, there are two methods. In the first method, the number of encoded bits is supplied to an encoder that performs the re-encoding process. In the second method, a quantizing scale is supplied to the encoder. Of course, both the number of encoded bits and the quanitzing scale can be supplied to the encoder. Since the amount of information of the quantizing scale is relatively large, in the present invention, from view points of the effectively and simplicity of the process, an average quantizing scale is used instead of the quantizing scale.

In the above description, there are following combinations of encoding parameters that can be used to suppress the deterioration of the picture quality in the re-encoding process. These encoding parameters can be used in the encoding process and the decoding process for each picture or each slice thereof.

(1) Picture type, moving vector, number of encoded bits, and average quantizing scale (2) Picture type, moving vector, and number of encoded bits (3) Picture type, moving vector, and average quantizing scale (4) Picture type, number of encoded bits, and average quantizing scale (5) Picture type and number of encoded bits (6) Picture type and average quantizing scale The number of encoded bits is the total number of encoded bits for each picture or each slice thereof. The number of encoded bits may be represented by bytes. Alternatively, the number of encoded bits may be rounded by blocks of 128 bytes (1 kbits).

The average quantizing scale is the average value of a quantizing scale of the average MB (macro block) of MBs having meaningful DCT coefficients for each picture or each slice thereof. MBs having DCT coefficients exclude skipped MBs and not-coded MBs that have been defined in the MPEG standard.

When an encoded picture signal is composed of only I pictures, since there is no a moving vector, it is not necessary to input a picture type to the encoder.

Next, with reference to FIG. 1, a structure that accomplishes the combination (1) will be described as an embodiment of the present invention. An MPEG decoder 10 receives a bit stream as a picture signal that has been encoded by the MPEG encoding method. The MPEG decoder 10 decodes the bit stream and supplies a decoded picture signal to a multiplexer 11. In addition, the MPEG decoder 10 supplies a picture type, a moving vector, the number of encoded bits of a picture, and an average quantizing scale used in a first encoding process to the multiplexer 11 and a terminal 16a.

The multiplexer 11 multiplexes these encoding parameters with a decoded picture signal. In reality, these encoding parameters are placed in header information of a decoded picture signal defined by for example a 525-line×60-field system or a blank area such as a blanking area of a decoded picture signal. When the encoding parameters are placed in the blanking area, for example a user definition area of a VB-ID format can be used.

An output signal of the multiplexer 11 is supplied to a recording/reproducing system including a record medium 12 such as a magnetic tape. The output signal of the multiplexer 11 is recorded on the magnetic tape. On the reproducing side, a signal reproduced from the record medium 12 is supplied to a demultiplexer 13. The demultiplexer 13 demultiplexes encoding parameters from the signal reproduced from the record medium 12. The demultiplexer 13 supplies the encoding parameters to a terminal 16b. In addition, the demultiplexer 13 supplies a picture signal demultiplexed from the signal reproduced from the record medium 12 to an MPEG encoder 14. When a switch 15 is placed on the terminal 16b side, the encoding parameters received from the demultiplexer 13 are supplied to the MPEG encoder 14 that performs a re-encoding process. Thus, with encoding parameters used in a decoding process (in a first encoding process that generates the bit stream), a re-encoding process can be preformed.

In the structure shown in FIG. 1, encoding parameters used in the encoding process (in the first encoding process that generates the bit stream) are directly supplied to the MPEG encoder 14. With the encoding parameters, the MPEG encoder 14 can perform the re-encoding process. In this case, the switch 15 is placed on the terminal 16a side. In FIG. 1, the encoding parameters are output from the MPEG decoder 10. Alternatively, a means that extracts encoding parameters from a bit stream and outputs the extracted encoding parameters may be disposed independently from the MPEG decoder 20.

Next, with reference to FIG. 2, another embodiment of the present invention will be described. In the embodiment shown in FIG. 2, the combination (2) is accomplished. A bit stream as a picture signal that has been encoded by the MPEG encoding process is supplied to an MPEG decoder 20, a moving vector and picture type extracting circuit 22, and a number-of-encoded-bit counter 23. The MPEG decoder 20 decodes the received bit stream and generates a decoded picture signal. The decoded picture signal is supplied to an MPEG encoder 21.

The moving vector and picture type extracting circuit 22 extracts a moving vector and a picture type from the bit stream and supplies the extracted moving vector and picture type to the MPEG encoder 21. Likewise, the number-of-encoded-bit counter 23 calculates the number of encoded bits with the bit stream and supplies the number of encoded bits to the MPEG encoder 21. The MPEG encoder 21 re-encodes a decoded picture signal received from the MPEG decoder 20 with the received moving vector, picture type, and the number of encoded bits.

Next, with reference to FIG. 3, a further embodiment of the present invention will be described. In the embodiment shown in FIG. 3, the combination (1) is accomplished. A bit stream as a picture signal that has been encoded by the MPEG encoding method is supplied to an MPEG decoder 30, an average quantizing scale extracting circuit 32, a moving vector and picture type extracting circuit 33, and a number-of-encoded-bit counter 34. The MPEG decoder 30 decodes the received bit stream and generates a decoded picture signal. The decoded picture signal is supplied to an MPEG encoder 31.

The average quantizing scale extracting circuit 32 extracts a quantizing scale from the bit stream, calculates an average quantizing scale for each picture, and supplies the average quantizing scale to the MPEG encoder 31. On the other hand, the moving vector and picture type extracting circuit 33 extracts a moving vector and a picture type from the bit stream and supplies the extracted moving vector and picture type to the MPEG encoder 31.

Likewise, the number-of-encoded-bit counter 34 calculates the number of encoded bits with the bit stream and supplies the number of encoded bits to the MPEG encoder 31. The MPEG encoder 31 re-encodes a decoded picture signal received from the MPEG decoder 30 with the supplied average quantizing scale, moving vector, picture type, and the number of encoded bits.

Figure 2:
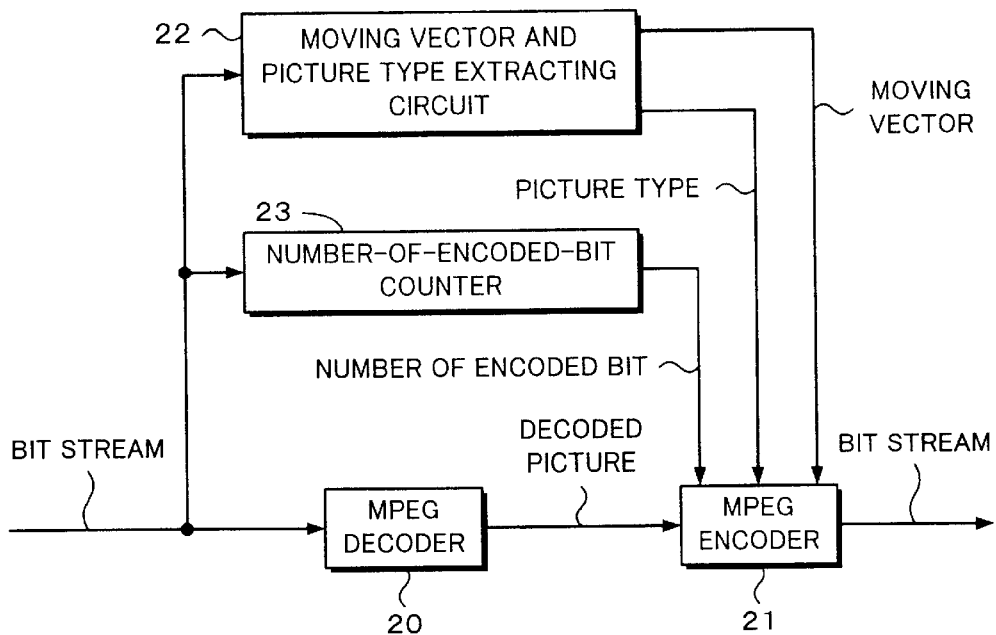
FIG. 2 is a block diagram for explaining another embodiment of the present invention.
Figure 3:
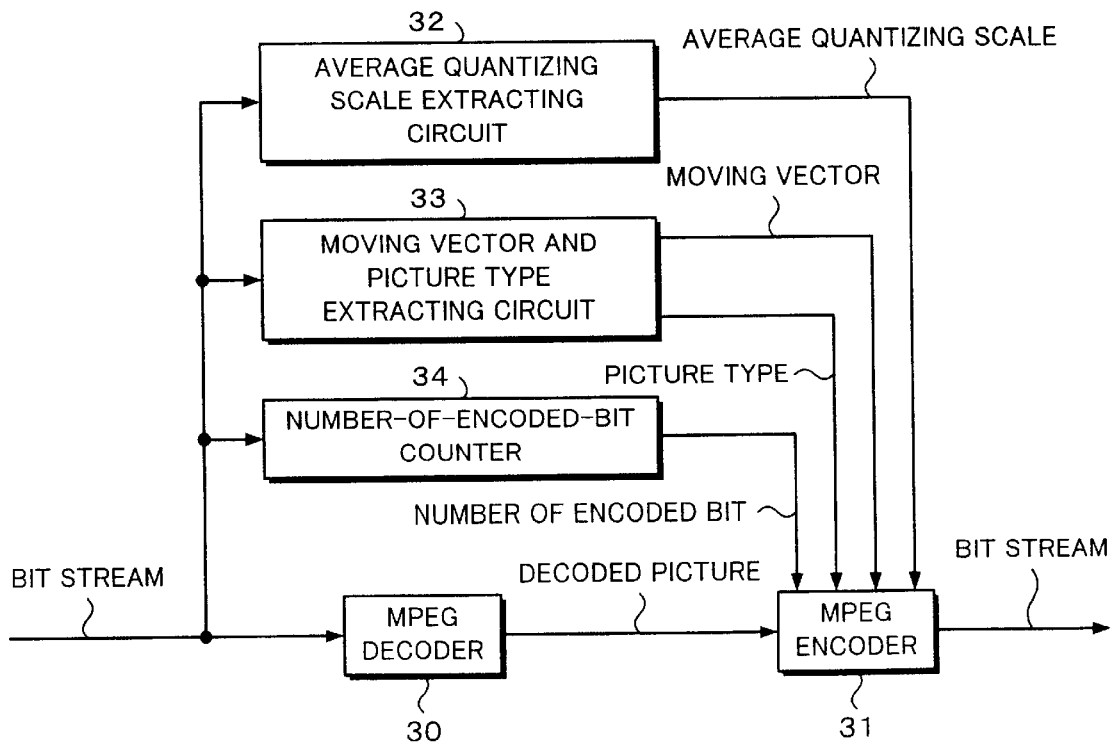
FIG. 3 is a block diagram for explaining a further embodiment of the present invention.

In FIGS. 2 and 3, a circuit that extracts encoding parameters from a bit stream is separated from the MPEG decoder 20. However, since encoding parameters are obtained in a decoding process for a bit stream, the MPEG decoder 20 may output the encoding parameters. When the number of bits of any encoding parameter is large and it adversely affects data transmission, it may be quantized in such a manner that the picture quality does not deteriorate. Thus, the total amount of information of encoding parameters that are transmitted can be decreased.

In the above-described embodiments, the combinations (1) and (2) are accomplished. However, when the MPEG decoder 10 outputs encoding parameters corresponding to the combinations (3) to (6) and the MPEG encoder 14 encodes a picture signal with the parameters, the combinations (3) to (6) can be accomplished. In particular, when the combinations (4) to (6) are accomplished, since the transmission of a moving vector can be omitted, the total amount of information of encoding parameters can be reduced.

Figure 4:
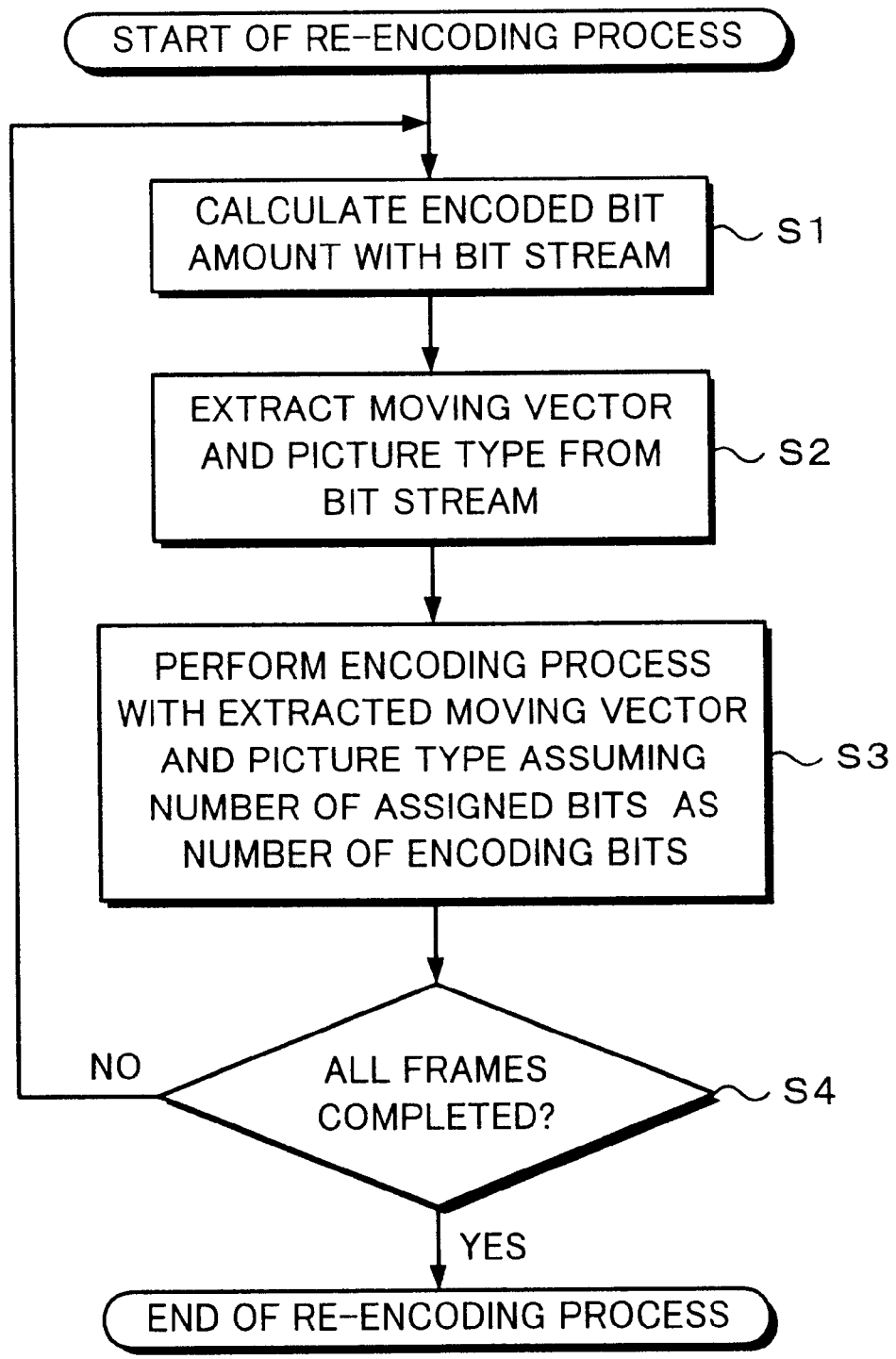
FIG. 4 is a flow chart for explaining a re-encoding process according to the present invention.

Next, with reference to a flow chart shown in FIG. 4, a re-encoding process according to an embodiment of the present invention will be described. In this example, the re-encoding process in the combination (2) will be described. However, in other combinations, the re-encoding process can be performed with different types of encoding parameters.

At step S1, the number of encoded bits is calculated with a bit stream. At step S2, a moving vector and a picture type are extracted from the bit stream. At step S3, the number of assigned bits is set as the number of encoded bits. In addition, the bit stream is encoded with the extracted moving vector and picture type. At step S4, it is determined whether or not all frames have been encoded. When all the frames have been encoded, the re-encoding process is completed. When all the frames have not been encoded, the flow returns to step S1. At step S1, another frame is re-encoded.

Next, with reference to a flow chart shown in FIG. 5, a feed-forward rate controlling process used with encoding parameters supplied to an encoder that performs a re-encoding process will be described. In this example, the re-encoding process in the combination (1) will be described. However, in other combinations, the re-encoding process can be performed with different types of encoding parameters.

After the encoding process is started, at step S101, a variable pict_i that represents the order of pictures is set to "1". Thus, the encoding process is performed for the first picture. At step S102, the number of assigned bits for a pict_i-th picture is set to the original number of encoded bits. At step S103, a variable mb_i that represents the order of macro blocks in the current picture is set to "1". Thus, the encoding process for the first macro block is started. At step S104, an initial value of a learning encoding parameter is calculated with an average quantizing scale corresponding to the following formula (1). The learning encoding parameter is used to calculate a quantizing scale (at step S106).

$$KQ[1] = MQT \times KR \times XA \times \text{weight\_mb}[1] \quad (1)$$

where KQ[1] is an initial value of the learning encoding parameter; MQT is an average quantizing scale; and XA and KR are calculated corresponding to the following formulas (2) and (4).

$$XA = \frac{\text{target\_bit}}{\sum_{NMB} X - mb[mb - i]} \quad (2)$$

where target_bit is the number of assigned bits per picture. At step S102, target_bit is set to the number of encoded bits. Encoding difficultness x_mb[mb_i] of mb_i-th picture is calculated by the following formula (3).

$$x\_mb[mb\_i] = fbit[mb\_i] \times \text{weight\_mb}[mb\_i] \quad (3)$$

where fbit[mb_i] is a predictive value of the number of bits generated when an MB is encoded with a fixed quantizing scale. fbit[mb_i] is calculated with an average value discrete residual for an I picture and with a predictive residual between pictures for P and B pictures. weight_mb[mb_i] is a parameter that represents the remarkableness of the deterioration of a picture. For example, weight_mb[mb_i] depends on the flatness, brightness, red chromaticity, and so forth. NMB represents the total number of macro blocks in the current frame.

$$KR = \frac{2 \times \text{bit\_rate}}{\text{frame\_rate} \times 31} \quad (4)$$

where frame_rate is the number of frames per second. At step S105, the number of assigned bits for the mb_i-th macro block is calculated corresponding to the following formula (5).

$$\text{target\_bit\_mb}[mb\_i] = XA \times x\_mb[mb\_i] \quad (5)$$

where target_bit_mb[mb_i] is the number of assigned bits of the mb_i-th macro block. The encoding difficultness x_mb[mb_i] is calculated corresponding to the above-described formula (3).

Next, at step S106, a quantizing scale of the mb_i-th macro block is calculated corresponding to the following formula (6).

$$mQ[mb\_i] = \frac{KQ[mb\_i]}{Kr \times XA \times \text{weight\_mb}[mb\_i]} \quad (6)$$

where mQ[mb_i] is a quantizing scale of the mb_i-th macro block. mb_i-th learning encoding parameter KQ[mb_i] is initially set at step S104 and then updated at step S108.

At step S107, the mb_i-th macro block is quantized and encoded. At step S108, the learning encoding parameter is updated corresponding to the following formula (7).

$$KQ[mb\_i+1] = KQ[1] + \text{frame\_bit\_generated}[mb\_i] - \text{sum\_target\_bit\_mb}[mb\_i] \quad (7)$$

where frame_bit_generated[mb_i] is the total number of bits of up to the mb_i-th macro blocks of the current picture; and sum_target_bit_mb[mb_i] is the total number of assigned bits of up to the mb_i-th macro blocks.

Next, at step S109, "1" is added to mb_i. Thus, the macro block number is updated. At step S110, it is determined whether or not mb_i is larger than NMB, the total number of macro blocks per picture. When mb_i is larger than NMB, it is determined that the process for the current picture has been completed. Thereafter, the flow advances to step S111. On the other hand, when mb_i is smaller than or equal to NBM, the flow advances to step S105. At step S105, the next macro block (namely, mb_i is incremented by "1") is processed.

At step S111, "1" is added to pict_i that represents the picture number. Thereafter, the flow advances to step S112. At step S112, it is determined whether or not pict_i is larger than NPICT, the total number of pictures per for example GOP. When pict_i is smaller than or equal to NPICT, the flow advances to step S102. At step S102, the next picture (namely, pict_i is incremented by "1") is processed. On the other hand, when pict_i is larger than NPICT, it is determined that the current GOP has been processed. Thus, the encoding process is completed.

In the above-described rate controlling process, the mb_i-th quantizing scale that represents the accuracy of the process for the mb_i-th macro block is calculated at step S106. To do that, the learning encoding parameter value is used (see Formula (6)). The learning encoding parameter is updated at step S108 (see Formula (7)). The initial value is calculated with the average quantizing scale at step S104 (see Formula (1)).

The average quantizing scale value is transferred in the above-described structure. The average quantizing scale value is used in the first encoding process. Thus, the rate controlling process is properly performed with the average quantizing scale value used in the first encoding process. Consequently, the number of encoded bits in the first encoding process can be matched with that in the re-encoding process.

In the above example, the case of which the number of encoded bits in the first encoding process is matched with that in the re-encoding process was described. Next, the rate controlling process in the case that the number of encoded bits is varied in the re-encoding process will be described. The flow of the process is the same as that of the process shown in FIG. 5 except for steps S102 and S104.

Figure 5:
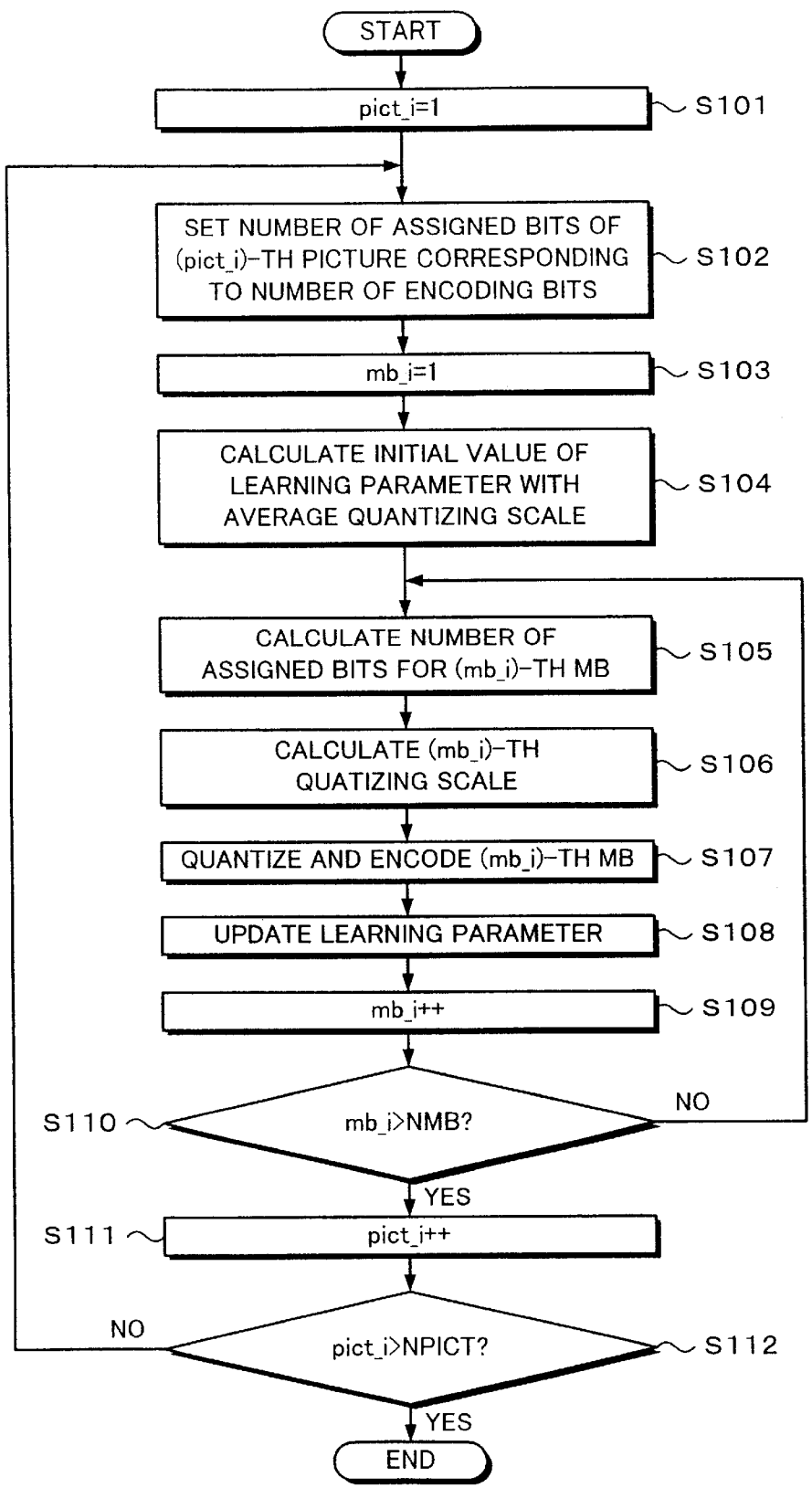
FIG. 5 is a flow chart for explaining a rate controlling process of a re-encoding process according to the present invention.

When the bit rate of an original encoded bit stream is denoted by R1 and the bit rate of a bit stream that has been re-encoded is denoted by R2, the number of assigned bits of a picture at step S102 of the flow chart shown in FIG. 5 is set corresponding to the following formula (8).

$$\text{target\_bit} = \text{picure\_bit\_size} \times R2/R1 \quad (8)$$

where picture_bit size is the number of encoded bits of a picture of an original encoded bit stream; and target_bit is the number of assigned bits of a picture that is re-encoded.

In addition, the initial value of the learning encoding parameter is set as follows at step S104 of the flow chart shown in FIG. 5. In other words, the calculation of KQ[1] of the formula (1) is substituted with the following formula (9).

$$MQT \times \text{picture\_bit\_size} = XMQT \times \text{target\_bit} KQ[1] = XMQT \times KR \times XA \times \text{weight\_mb}[1] \quad (9)$$

where MQT is an average quantizing scale of an original encoded bit stream.

In the MPEG encoding method, unlike with picture types, there are four types of macro blocks that are an intra-frame encoded macro block, a forward inter-frame predictive macro block (of which a future macro block is predicted with a past macro block), a backward inter-frame predictive macro block (of which a past macro block is predicted with a future macro block), and an interpolative macro block (of which a macro block is predicted with both a past macro block and a future macro block).

All macro blocks in an I picture are intra-frame encoded macro blocks. A P picture contains both intra-frame encoded macro blocks and forward inter-frame predictive macro blocks. A B picture contains all the four types of macro blocks.

In reality, the present invention can be applied to a picture signal recording/reproducing apparatus that converts an input analog picture signal into a digital picture signal, compresses the digital picture signal, (or compresses an input digital picture signal), records the compressed signal on an optical disc as a record medium, decompresses the compressed digital picture signal recorded on the optical disc, and reproduces the decompressed digital picture signal.

Next, the structure and operation of the recording system will be described. In FIG. 6, a digital picture signal is directly supplied to an input terminal 61. An analog picture signal is supplied to an input terminal 62. The analog picture signal is a photographed picture signal, a broadcast picture signal received through an antenna, or the like. The analog picture signal is supplied to an A/D converting portion 63. The A/D converting portion 63 converts the analog picture signal into a digital picture signal. The digital picture signal received from the input terminal 61 and the digital picture signal received from the A/D converting portion 63 are supplied to an MPEG encoder 65 through a picture signal controlling portion 64.

The picture signal controlling portion 64 selects one of the digital picture signal received from the A/D converting portion 63 and the digital picture signal received from the input terminal 61 under the control of a system controller 75 corresponding to information received from a record control signal inputting portion 74 to which the user has input particular data. The picture signal controlling portion 64 supplies the selected signal to the MPEG encoder 65. The MPEG encoder 65 compression-encodes the picture signal received from the picture signal controlling portion 64.

The digital picture signal compressed by the MPEG encoder 65 is stored to a recording buffer memory portion 66a of an integrated buffer memory 66. A memory controlling portion 67 assigns an address of the recording buffer memory portion 66a for the compressed digital picture signal.

The digital picture signal stored in the recording buffer memory portion 66a is supplied to an optical disc drive through a data processing portion 68 and a recording/reproducing selection switch 69. The data processing portion 68 is composed of a record signal processing portion 68a and a reproduction signal processing portion 68b. The record signal processing portion 68a performs an error correction code encoding process, a digital modulating process, and so forth. The reproduction signal processing portion 68b performs an error correcting process, a digital demodulating process, and so forth. The optical disc drive has an optical head 70 and a spindle motor 72. The optical head 70 radiates record laser light to an optical disc 71 and records a signal thereto. In addition, the optical head 70 radiates reproduction laser light to the optical disc 71 and reproduces a signal therefrom. The spindle motor 72 rotates and drives the optical disc 71. The optical head 70 and the spindle motor 72 are controlled by a disc/head controlling portion 73. The optical head 70 records an output signal of the record signal processing portion 68 to the optical disc 71. The optical disc 71 is a rewritable optical disc such as an MO (magneto-optical) disc or a phase-change type disc.

The system controller 75 controls the optical disc drive under the control of the disc/head controlling portion 73. In addition, the system controller 75 controls the state of the optical disc drive and supplies information of the state of the optical disc drive to the memory controlling portion 67 so as to control data received from the integrated buffer memory 66.

Next, the reproducing system will be described. The reproducing system has an MPEG decoder 77, the picture signal controlling portion 64, and a D/A converting portion 79. The MPEG decoder 77 decodes a reproduction signal received from a reproducing buffer memory portion 66b of the integrated buffer memory 66 through a bus. The picture signal controlling portion 64 selects a demodulated picture signal received from the MPEG decoder 77. The D/A converting portion 79 converts a picture signal selected by the picture signal controlling portion 64 into an analog picture signal.

In the reproducing mode, the disc/head controlling portion 73 controls a servo operation, a head operation, and so forth of the optical disc drive. The disc/head controlling portion 73 supplies a reproduction signal to the reproducing buffer memory portion 66b through the reproduction signal processing portion 68b and the bus. The reproducing buffer memory portion 66b supplies the reproduction picture signal to the MPEG decoder 77 so that the writing operation of the reproduction signal and the reading operation of the reproduction signal are balanced. The MPEG decoder 77 performs an MPEG decoding process for the reproduction signal and supplies the decoded picture signal to the picture signal controlling portion 64.

The picture signal controlling portion 64 is controlled under the control of the system controller 75 corresponding to information received from a reproduction control signal inputting portion 76 to which the user has input particular data. The picture signal controlling portion 64 performs a switching process for the decoded picture signal received from the MPEG decoder 77 and outputs the decoded picture signal to the D/A converting portion 79 or an output terminal 78. The D/A converting portion 79 converts a digital picture signal selected by the picture signal controlling portion 64 into an analog signal and supplies the analog picture signal to an output terminal 80.

The picture signal controlling portion 64 is composed of a selection switch SW1 and a selection switch SW2. The selection switch SW1 has input terminals a, b, c, and an output terminal d. The digital picture signal received from the input terminal 61 is supplied to the input terminal a of the selection switch SW1. The digital picture signal received from the A/D converting portion 63 is supplied to the input terminal b of the selection switch SW1. The decoded picture signal received from the MPEG decoder 77 is supplied to the input terminal c of the selection switch SW1. The picture signal selected by the selection switch SW1 is supplied from the output terminal d of the selection switch SW1 to the MPEG encoder 65. On the other hand, the selection switch SW2 has input terminals e and f and an output terminal g. The digital picture signal received from the input terminal 61 is supplied to the input terminal e of the selection switch SW2. The decoded picture signal received from the MPEG decoder 77 is supplied to the input terminal f of the selection switch SW2. The picture signal selected by the selection switch SW2 is supplied from the output terminal g of the selection switch SW2 to the output terminal 78 and the D/A converting portion 79.

The system controller 75 controls the switches SW1 and SW2 of the picture signal controlling portion 64. In reality, when a user's command supplied to the system controller 75 through the record control signal inputting portion 74 designates an external digital picture signal received from the input terminal 61, the input terminal a of the switch SW1 is connected to the output terminal d. When a user's command supplied to the system controller 75 through the record control signal inputting portion 74 designates a picture signal received from the input terminal 62, the input terminal b is connected to the output terminal d.

When a user's command represents a command for combining particular picture input data and picture data reproduced from an optical disc 71 and recording the combined picture data to the optical disc 71, the system controller 75 controls a timing for connecting the output terminal d to the input terminal c. In other words, an output signal of the MPEG decoder 77 is directly supplied to the MPEG encoder 65. The MPEG encoder 65 re-encodes the decoded signal.

The picture signal recording/reproducing apparatus is controlled by the integrated buffer memory 66 and the system controller 75. The integrated buffer memory 66 variably assigns the recording memory area and the reproducing memory area. The system controller 75 assigns the memory areas of the integrated buffer memory 66 corresponding to the recording mode or reproducing mode. In other words, the memory areas of the recording buffer memory portion 66a and the reproducing buffer memory portion 66b are varied under the control of the system controller 75 through the memory controlling portion 67. For example, in the recording mode, all the integrated buffer memory 66 is used for the recording buffer memory portion 66a. In contrast, in the reproducing mode, all the integrated buffer memory 66 is used for the reproducing buffer memory portion 66b. In the simultaneous recording/reproducing mode, the integrated buffer memory 66 may be equally shared by the recording buffer memory portion 66a and the reproducing buffer memory portion 66b.

Alternatively, the re-encoding process according to the present invention may be performed only in the vicinity of an edit point. For the other portions, a bit stream may be switched.

Next, the effects of the re-encoding process according to the present invention will be described in comparison with a conventional re-encoding process. To determine the deterioration of picture quality, SNR (Signal Noise Rate) values in a re-encoding process for five standard sequences (bus, bicycle, mobile & calender, flower garden, and cheerleader) corresponding to CCIR (Comité Consultatif International Radiophonique) standard are compared. The SNR value for a picture signal composed of eight bits per pixel is calculated corresponding to the following formula (10).

$$SNR = 20 \log \frac{255}{MeanError} [dB] \quad (10)$$

where pixel_num is the number of pixels per picture; and MeanError is an average value of the number of errors per pixel. MeanError is calculated corresponding to the following formula (11).

$$MeanError = \sqrt{\frac{SumError}{pixel\_num}} \quad (11)$$

where SumError is the total number of errors of all pixels. SumError is calculated corresponding to the following formula (12).

$$SumError = \sum_{i=0}^{pixel\_num-1} |Orgi - Curi| \quad (12)$$

where Orgi is the value of an i-th pixel of an original picture; and Curi is the value of an i-th pixel of an encoded picture.

FIG. 7 is a table showing the relation between SRN values in a conventional re-encoding process of which a picture type and a moving vector in a re-encoding process match those in a first encoding process and SRN values in the re-encoding process according to the present invention of which a picture type, a moving vector, and the number of encoded bits in a re-encoding process match those in a first encoding process. In all the five sequences, SNR values in the re-encoding process according to the present invention are higher than those in the conventional re-encoding process. Thus, it is clear that the present invention is effective to suppress the deterioration of picture quality.

FIG. 8 is a table showing the relation between SRN values in a conventional re-encoding process of which only a picture type in a re-encoding process matches that in a first encoding process and SRN values in the re-encoding process according to the present invention of which a picture type and the number of encoded bits in a re-encoding process match those in a first encoding process. In all the five sequences, SNR values in the re-encoding process according to the present invention are higher than those in the conventional re-encoding process. Thus, it is clear that the present invention is effective to suppress the deterioration of picture quality.

Next, with reference to the accompanying drawings, another embodiment of the present invention will be described. In FIG. 10A, reference numeral 101 is an MPEG decoder. Reference numeral 102 is a multiplexer. Reference numeral 103 is a recording/reproducing apparatus including a record medium (alternatively, a communication path, in the following description, simply referred to as record medium). Reference numeral 104 is a demultiplexer. Reference numeral 105 is an MPEG encoder that performs a re-encoding process. A bit stream is supplied to the MPEG decoder 101. The MPEG decoder 101 decodes the bit stream and outputs a decoded picture signal (digital signal). The MPEG decoder 101 extracts encoding feature point information Ip from the video bit stream and supplies the encoding feature point information Ip to the multiplexer 102. The multiplexer 102 also receives control information Ic. The multiplexer 102 converts the decoded picture signal into a transmission picture signal (for example, an NTSC format transmission picture signal) and multiplexes the control information Ic, the encoding feature point information Ip with and the decoded picture signal.

The recording/reproducing apparatus 3 is for example a 525/60 (or 625/50) component system digital VCR or a disc recorder. The present invention can be also applied to a structure using a wireless (broadcasting) path or a cable transmission path.

A transmission picture signal is recorded on the record medium 103 and reproduced therefrom. As described above, the encoding feature point information Ip and the control information Ic are multiplexed with the transmission picture signal. The information Ip and Ic are superimposed in a non-pixel area such as a horizontal blanking interval or a vertical blanking interval. Thus, when a transmission picture signal is supplied to the record medium 103, the recording system, and the reproducing system, the information Ip and Ic are stored as they are. Alternatively, the information Ip and Ic can be placed in the LSB of an effective picture signal.

The demultiplexer 104 extracts an encoding target area from the transmission picture signal corresponding to the control signal Ic. In addition, the demultiplexer 104 extracts the encoding feature point information Ip from the transmission picture signal corresponding to the control information Ic. With the extracted encoding feature point information Ip, the MPEG encoder 105 performs a re-encoding process. The MPEG encoder 105 forms a frame structure with an indicator that is temporal information of the control information Ic. Alternatively, the demultiplexer 104 may form a frame structure. The MPEG encoder 105 outputs a video bit stream of the re-encoded video signal.

The encoding feature point information Ip contains a picture encoding type, a flag top_field_first (TFF), and a flag repeat_first_field (RFF). The picture encoding type represents a picture type I, P, or B. The flag TFF is composed of one bit. When TFF=1, the top field is displayed at the first temporal position. The flag RFF is composed of one bit. When RFF=1, an MPEG decoded frame is displayed in a time period of three fields. In other words, a field at a second temporal position is followed by a field at a first temporal position. The field at the first temporal position is repeatedly displayed and represented by the flag TFF. With such encoding feature point information Ip, the MPEG encoder 105 generates a bit stream that has the same picture encoding type and the same order as a bit stream that is input to the MPEG decoder 101.

The control information Ic that represents the spatial and temporal relations of an encoded area and an encoding target area corresponding thereto is supplied to the re-encoder side. The control information Ic contains an indicator of a display start field of an MPEG decoded picture of an I frame, a P frame, or a B frame of a transmission picture signal (the display start field may be termed transmission start field, hereinafter referred to as display start field), a display start line number of a top field of the MPEG decoded picture of the transmission picture signal (display start line number of a bottom field=display start line number of top field+1 line), and a spatially horizontal start position of the MPEG decoded picture of the transmission picture signal.

The indicator of the display start field represents a field that is displayed first in one frame. The indicator is a flag composed of for example one bit. With reference to the indicator, the re-encoder side can precisely form one frame with two fields. Spatial information (line number and horizontal start position) of the control information Ic has been defined corresponding to an application format. Thus, a code signal that represents an application format can be used as control information instead of a line number. In addition, since the spatial information does not frequently vary, only spatial information that corresponds to a varied point is transmitted. With reference to spatial information of the control information Ic, the re-encoder side can correctly extract an encoding target area.

FIG. 10A shows the structure of which an encoded picture signal is transmitted through a record medium 103. However, unlike with the structure shown in FIG. 10B, the structure shown in FIG. 10 does not contain the record medium 103. Thus, an MPEG decoder 101, a multiplexer 102, a demultiplexer 104, and an MPEG encoder 105 may be connected by single lines. In the structure shown in FIG. 10B, the multiplexer 102 multiplexes encoding feature point information Ip with a transmission picture signal corresponding to the control information Ic. The control information Ic is transmitted to the re-encoder side through a signal line different from that for the transmission picture signal.

In FIGS. 10A and 10B, codec information (control information such as a moving vector, a quantizing scale, and generated data amount) that is used in the decoding process of the MPEG decoder 101 is re-used by the MPEG encoder 105. Thus, the deterioration of the picture quality in the decoding process and the re-encoding process can be minimized. In an application such as an editing process, the decoding process and the re-encoding process may be performed only in the vicinity of an edit point. A stream may be switched for other areas.

Figure 12:
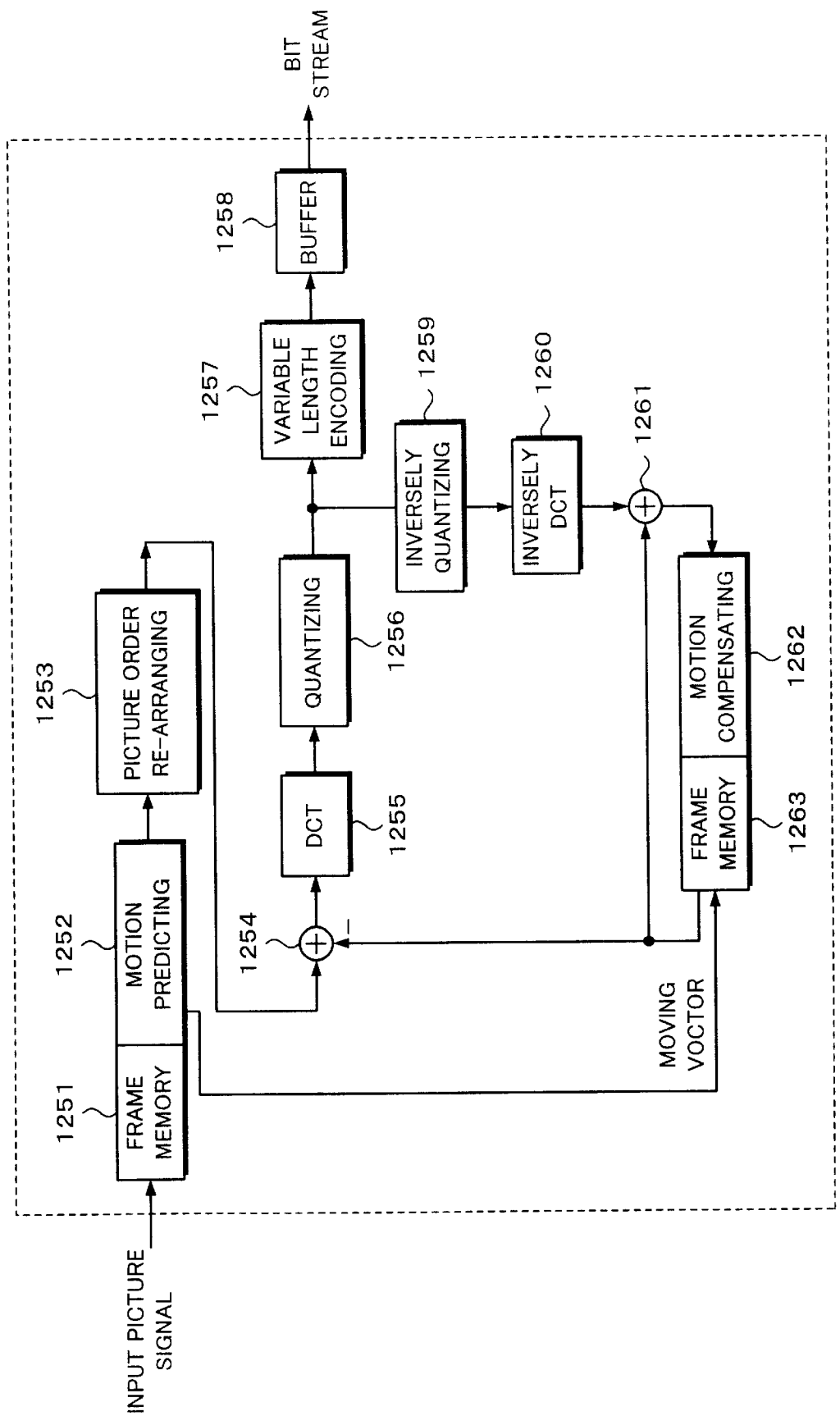
FIG. 12 is a block diagram showing an example of the structure of an MPEG encoder according to another embodiment of the present invention.

FIG. 11 is a block diagram showing an example of the structure of the MPEG decoder 101. FIG. 12 is a block diagram showing an example of the structure of the MPEG encoder 105. With reference to FIG. 12, the structure of the MPEG encoder 105 will be described. The MPEG encoder 105 has an encoding controlling portion (not shown). The encoding controlling portion controls each structural portion of the MPEG2 encoder for each frame or each field so as to compresse input picture data to one of an I picture, a P picture, and a B picture. In addition, the encoding controlling portion controls quantizing characteristics so as to control the rate of an encoded output signal. The decoder side supplies the encoding feature point information Ip and codec information to the encoding controlling portion. Thus, the same bit stream that has not been decoded is generated.

(4:2:0) component video data is supplied to a frame memory 1251 and a motion predicting portion 1252 of the MPEG2 encoder 105. The frame memory 1251 and the motion predicting portion 1252 detect a moving vector. An input picture signal is supplied to a picture order re-arranging portion 1253. The picture order re-arranging portion 1253 re-arranges the order of pictures so that the encoding process can be properly performed. In other words, the picture order re-arranging portion 1253 encodes I and P pictures and then B pictures.

The resultant picture signal is supplied to a subtracting portion 1254. A motion compensating portion 1263 supplies motion-compensated local decoded data to the subtracting portion 1254. Differential data between the input data and the local decoded data is supplied to a DCT portion 1255. A control signal that designates a field DCT or a frame DCT is supplied to the DCT portion 1255.

An output signal of the DCT portion 1234 is supplied to a quantizing portion 1256. The encoding controlling portion supplies a control signal that designates a quantizing characteristic to the quantizing portion 1256. A local decoding portion is connected to the quantizing portion 1256. The local decoding portion is composed of an inversely quantizing portion 1259, an inversely DCT portion 1260, an adding portion 1261, a frame memory 1262, and a motion compensating portion 1263. The inversely quantizing portion 1259 performs an inverse process of the quantizing portion 1256. The inversely DCT portion 1260 performs an inverse process of the DCT portion 1255. The motion compensating portion 1263 supplies a local decoded signal to the subtracting portion 1254. The subtracting portion 1254 detects a predictive error. The motion compensating portion 1263 can perform a forward prediction, a backward prediction, and a bidirectional prediction. When a signal is intra-encoded, the subtracting portion 54 does not perform a subtracting process. Instead, the signal simply passes through the subtracting portion 54.

A variable length code encoding portion 1257 is connected to the quantizing portion 1256. The variable length code encoding portion 1257 performs a variable length code encoding process. In addition, the variable length code encoding portion 1257 places additional information as a picture header to an input signal. Information placed to the header is information such as a flag and a moving vector. An encoded output signal of the variable length code encoding portion 1257 is supplied to a buffer 1258. The buffer 1258 outputs a variable length code encoded signal as a bit stream at a constant rate.

Next, the structure of the MPEG decoder 101 shown in FIG. 11 will be described. A bit stream that has been encoded by an encoder similar to the above-described MPEG encoder is supplied to a buffer 1111. The encoder side performs a virtual buffer controlling process for controlling the amount of generated information so that the buffer 1111 does not underflow or overflow. An output signal of the buffer 1111 is supplied to a variable length code decoding portion 1112. The variable length code decoding portion 1112 extracts encoding feature point information such as picture encoding type and coding information (not shown).

With the encoding feature point information and the coding information, the process of the decoder 101 is controlled. In addition, the encoding feature point information and the codic information are supplied to a multiplexer 102. The multiplexer 102 places the encoding feature point information and the codic information to a transmission picture signal. Alternatively, the encoding feature point information and the codic information are supplied to the re-encoder side through a signal line different from that for the transmission picture signal. With the encoding feature point information Ip, the MPEG encoder 105 performs a re-encoding process. Since the encoder 105 performs the re-encoding process with the encoding feature point information and the codic information generated by the decoder 101, the picture quality of a bit stream that is output from the encoder 105 does not almost deteriorate in comparison with that of a bit stream that is input to the decoder 101.

An output signal of the variable length code decoding portion 1112 is reversely processed by an inversely DCT portion 1113. An output signal of the inversely DCT portion 1113 is supplied to an inversely quantizing portion 1114. An output signal of the inversely quantizing portion 1114 is supplied to an adding portion 1115. A local decoding portion supplies locally decoded picture data to the adding portion 1115. The local decoding portion is composed of a frame memory 1117 and a motion compensating portion 1118. When an intra-encoding process is performed, the adding portion 1115 does not perform the adding process. Instead, data just passes through the adding portion 1115. Decoded data that is output from the adding portion 1115 is supplied to the picture order re-arranging portion 1116. Thus, a decoded picture signal with pictures arranged in the original sequence is obtained. As described above, the multiplexer 102 multiplexes the encoding feature point information Ip and the control information Ic with the decoded picture signal.

FIGS. 13A, 13B, 13C, and 13D are timing charts showing an input signal an output signal of the decoder 101 and an input signal and an output signal of the encoder 105, respectively. FIG. 13A shows a bit stream that is input to the decoder 101. In FIG. 13A, M that represent intervals of I or P pictures is 3. The order of pictures that are input to the decoder 101 is the same as the arrangement of those on a record medium or a transmission path. The decoder 101 decodes I pictures and P pictures and then B pictures. The decoder 101 outputs decoded pictures in the order shown in FIG. 13B. The decoded pictures are input to the encoder 105 that performs a re-encoding process in the order shown in FIG. 13C. The encoder 105 generates a bit stream shown in FIG. 13D. After a decoded picture signal is input to the encoder 105 until a bit stream is output from the encoder 105, a delay DL (in this example, DL=3 frames) takes place.

FIGS. 14A, 14B, 14C, and 14D are timing charts showing an input signal and an output signal of a decoder 101 that decodes a bit stream and re-encodes the decoded signal and an input signal and an output signal of the encoder 105, respectively. FIG. 14A shows a bit stream that is input to the decoder 101. In this example, M that represents intervals of I pictures or B pictures is 3. The decoder 101 decodes I pictures and P pictures and then B pictures and outputs decoded pictures in the order shown in FIG. 14B. The decoded pictures are input to the encoder 105 that performs a re-encoding process in the order shown in FIG. 14C. The encoder 105 generates a bit stream shown in FIG. 14D. After a decoded picture signal is input to the encoder 105 until a bit stream is output from the encoder 105, a delay DL (in this example, DL=2 frames) takes place.

According to an embodiment of the present invention, the multiplexer 102 multiplexes the encoding feature point information Ip received from the MPEG decoder 101 and the control information Ic with the decoded picture signal and supplies the resultant signal to the MPEG encoder side. Preferably, the multiplexer 102 supplies the codec information to the re-encoder side. Next, the encoding feature point information Ip and the control information Ic will be described.

Figure 15:
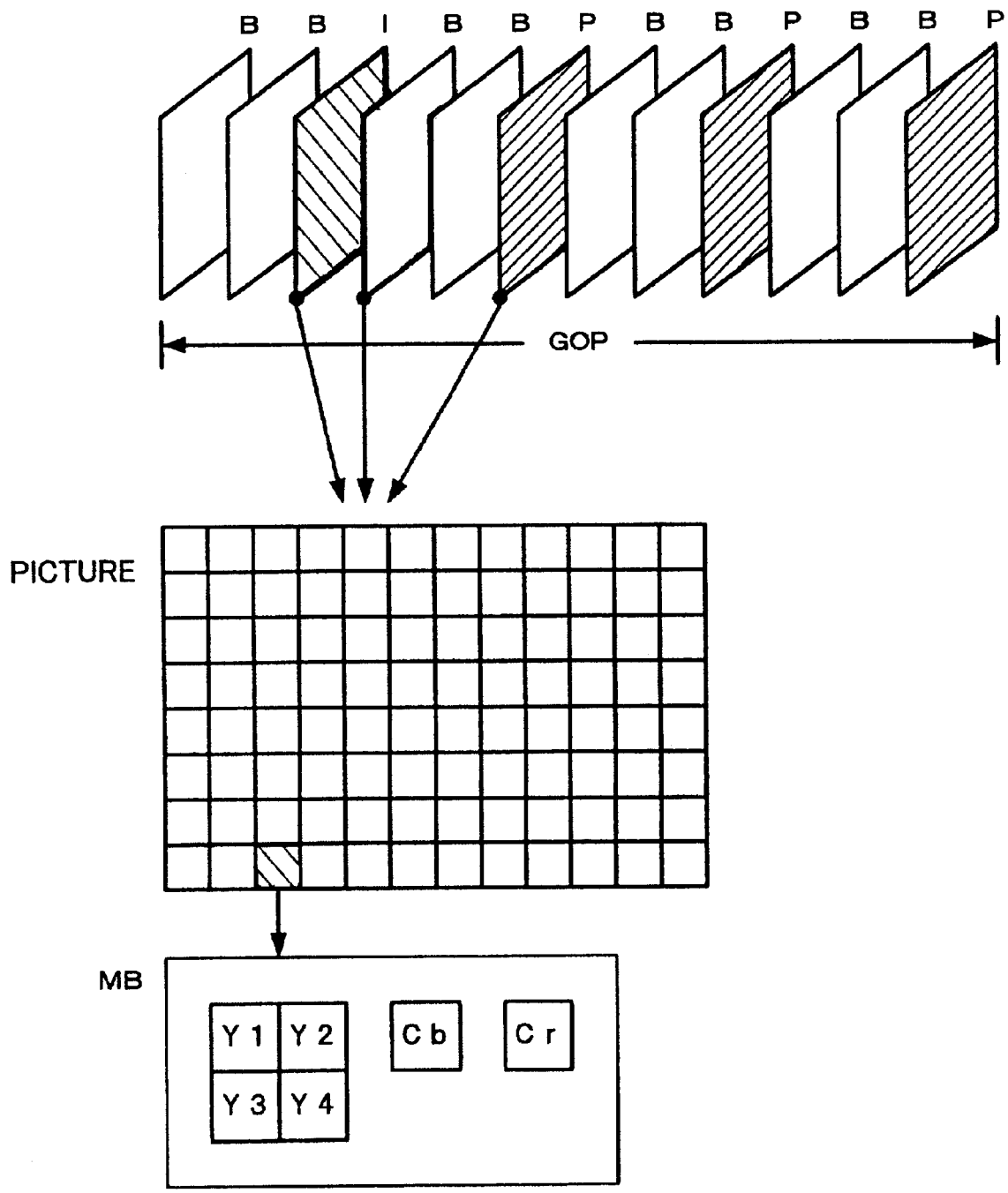
FIG. 15 is a schematic diagram for explaining the data structure of MPEG encoding method.

FIG. 15 shows the structure of MPEG data. In FIG. 15, I, P, and B represent picture encoding types.

In an I picture (Intra-coded picture), when a picture signal is encoded, information of only one picture is used. Thus, when an encoded picture signal is decoded, information of only the I picture is used. In a P picture (Predictive-coded picture), as a predictive picture (a reference picture for obtaining a difference with the current P picture), an I picture or another P picture that has been decoded is temporally followed by the current P picture. The difference between the current P picture and a motion-compensated predictive picture is encoded for each macro block. Alternatively, the current P picture is encoded for each macro block without obtaining the difference of such pictures. One of those methods is selected whichever higher efficiency is obtained. In a B picture (Bidirectionally predictive-coded picture), as predictive pictures (reference pictures for obtaining a difference with the current B picture), three types of reference pictures are used. The first type reference picture is an I picture or a P picture that has been decoded and that is temporally followed by the current B picture. The second type reference picture is an I picture or a P picture that has been decoded and that is temporally preceded by the current B picture. The third type reference picture is an interpolated picture of the first type reference picture and the second type reference picture. The difference between the current B picture and each of the three type reference pictures that have been motion-compensated is encoded for each macro block. Alternatively, the current B picture is encoded for each macro block without obtaining such a difference. One of those methods is selected whichever higher efficiency is obtained.

Thus, there are a frame intra-coded macro block, a forward inter-frame predictive macro frame (a future macro block is predicted with a past macro block), a backward inter-frame predictive macro block (a past macro block is predicted with a future macro block), and an interpolative macro block (a current macro block is predicted with both a future macro block and a past macro block). All macro blocks in an I picture are intra-frame coded macro blocks. A P picture contains intra-frame coded macro blocks and forward inter-frame predictive macro blocks. A B picture contains the above-described four types of macro blocks.

In addition, a GOP (Group Of Pictures) is composed of at least one I picture and 0 or a plurality of non-I pictures. FIG. 15 shows an example of N=12 (where N is the number of frames of a GOP) and M=3 (where M is intervals of I or P pictures). In FIG. 15, the order of pictures of the GOP is the order of original pictures. When the GOP is encoded, the order of BBI or BBP is changed to the order of IBB or PBB. On a record medium, the GOP is arranged in the changed order. The GOP is decoded in the changed order. After the GOP is decoded, the pictures are arranged in the original order.

FIG. 15 also shows that each picture is divided into many macro blocks and that each macro block is composed of six blocks that are four adjacent brightness blocks and two color difference blocks Cb and Cr that are placed at the spatially same position. Each of these blocks is composed of (8×8) pixels. These blocks are transmitted in the order of Y1, Y2, Y3, Y4, Cb, and Cr.

Figure 16:
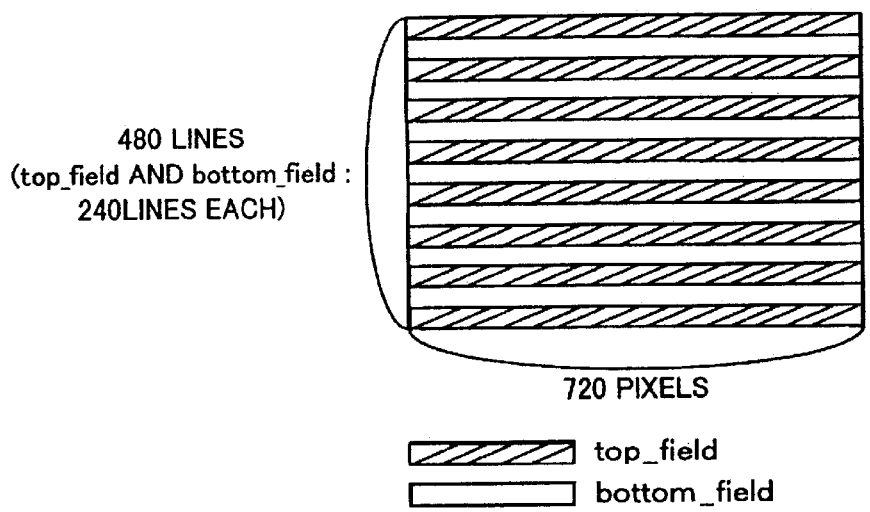
FIG. 16 is a schematic diagram showing a format of a frame.

FIG. 16 is a schematic diagram showing a picture format of an MPEG frame structure (a format of an MPEG decoded picture). In FIG. 16, black stripes and white stripes represent top field lines and bottom field lines, respectively. In the NTSC transmission picture signal format, one frame has 240 top field lines and 240 bottom field lines. The number of horizontal pixels is 704. A flag TFF (one bit) of header information on a picture layer represents which of a top field or a bottom field is displayed temporally first. When TFF=1, a top field is displayed temporally fast.

Figure 17:
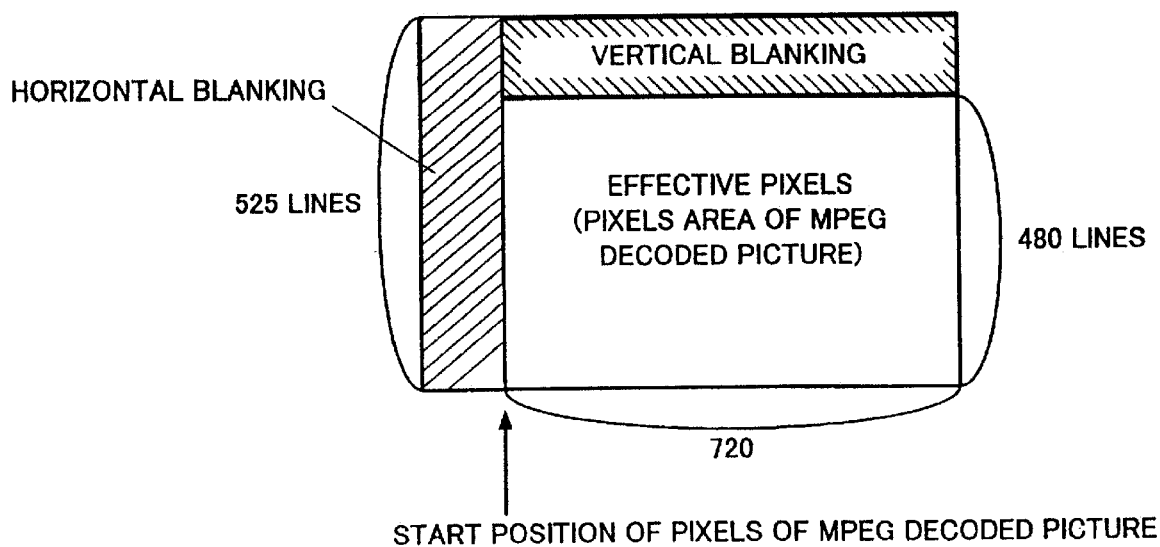
FIG. 17 is a schematic diagram showing a spatial relation between an MPEG decoded picture and a transmission picture format.

FIG. 17 shows the spatial relation between an MPEG decoding picture and a transmission picture format. The transmission picture format is an NTSC transmission picture format. As described above, an effective pixel area (pixel area of an MPEG decoded picture) is composed of 780 pixels×480 lines. The transmission picture format includes non-effective areas of a horizontal blanking area and a vertical blanking area. FIG. 17 shows a start position of spatially horizontal pixels of an MPEG decoded picture of a transmission picture. The start position is denoted by a pixel number or the like that varies depending on an application format or the like. In an embodiment of the present invention, the control information Ic contains information of the start position. When the decoder side receives a transmission picture signal, it securely knows the start position of horizontal pixels with the control information Ic.

In addition to the above-described TFF, another flag RFF is supplied. The flag RFF represents that repetitive fields are present. A film material such as a movie is data of 24 frames per second. On the other hand, a video signal (for example, an NTSC video signal) is data of 30 frames per second. Thus, when a film material is converted into a video signal, a process for converting 24 frames into 30 frames is required. Since such a process includes a process for converting two fields into three fields in a predetermined pattern, the process is referred to as 2:3 pull-down process. In other words, the first field is automatically repeated twice every five frames. Thus, 24 frames are converted into 30 frames. Telecine Unit is known as a unit that converts a film material into a television material.

When a video signal obtained by the 2:3 pull-down process is compressed by the MPEG encoding method, since information of inserted fields (repetitive fields) is redundant, when the encoding process is performed, the repetitive fields are removed so as to improve the compressing efficiency. A process for detecting repetitive fields of picture data, removing them, and converting 30 frames into 24 frames is referred to as inverse 2:3 pull-down process.

Next, with reference to FIG. 18, the 2:3 pull-down process of which a film material of 24 frame per second is converted into an NTSC television material of 30 frames per second will be described. The film material is data of 24 frames per second. The same pictures of two fields (first and second fields) are formed of each frame. Thus, a picture signal of 48 fields per second is formed. Next, four frames (eight fields) of the film material are converted into five frames (10 fields) of a video signal (for example, an NTSC video signal).

Figure 18:
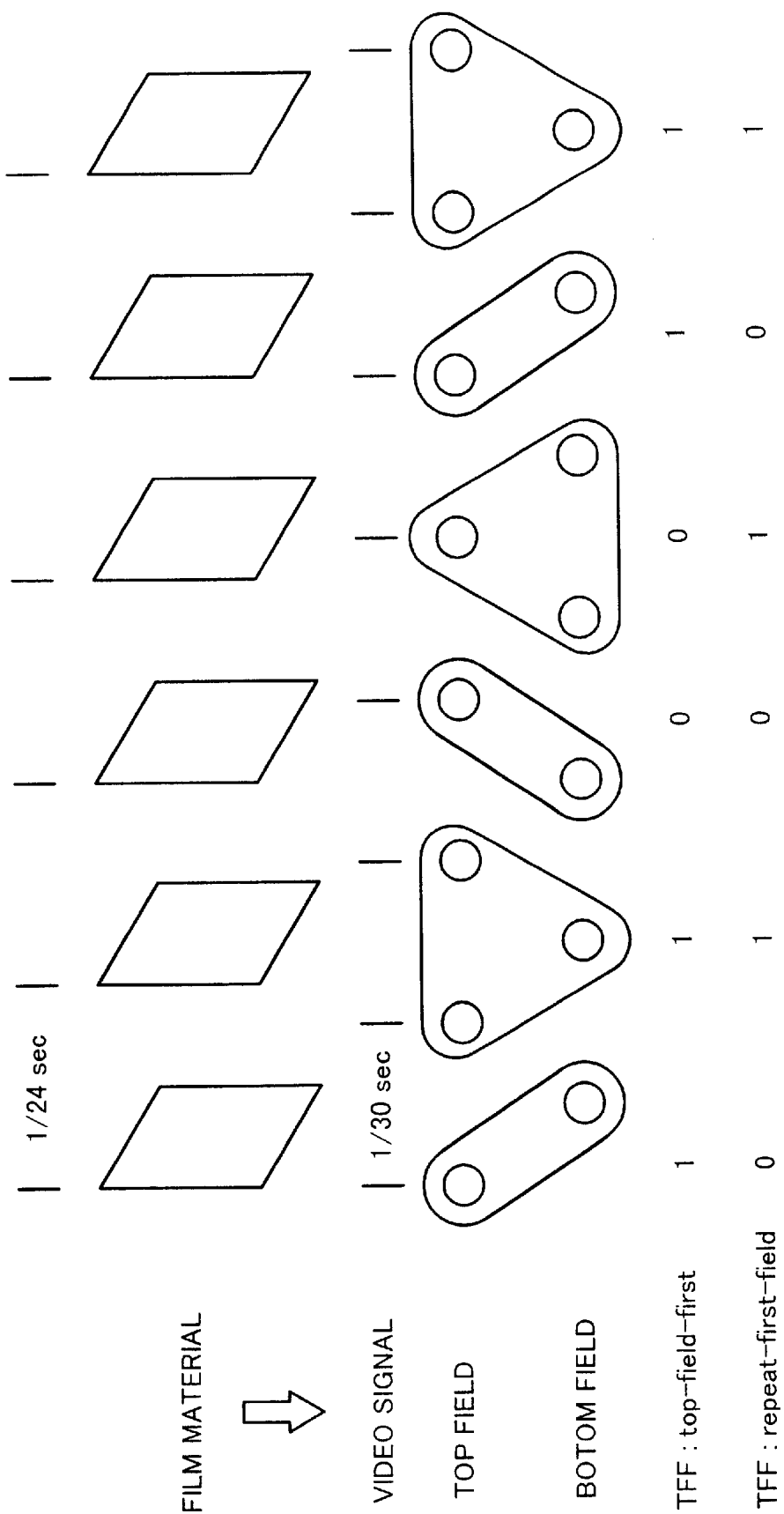
FIG. 18 is a timing chart for explaining a 2:3 pull-down process.

In FIG. 18, the temporally last field of three fields in a triangle is a repeat first field that is repeated to increase a field. Two repeat first fields take place every five frames. Two flags TFF and RFF are added to a video signal of which the 2:3 pull-down process has been performed. In the case of a frame structure, the flag TFF represents whether the first field is a top field or a bottom field. The flag RFF represents that repetitive fields are present.

Next, the temporal relation between an MPEG decoded picture format and a transmission picture format will be described. In this example, the transmission picture format is the NTSC format. For simplicity, it is assumed that the display start line (the vertical position of a decoded picture) has been defined. FIG. 19 is a schematic diagram showing an example of which top fields and bottom fields of an MPEG decoded picture with TFF=1 and RFF=0 are transmitted in odd cycles and even cycles, respectively. FIG. 19 is a schematic diagram showing vertical sections of individual fields. In FIG. 19, O and X represent lines of individual fields. As described with reference to FIG. 17, a pixel area of an MPEG decoded picture of each field (namely, a box area in FIG. 19) has 240 lines. However, in FIG. 19, for simplicity, part of lines are illustrated. The notation shown in FIG. 19 applies to FIGS. 20 and 21.

In the example shown in FIG. 19, since TFF=1, the top fields of odd cycles are displayed. The bottom fields of even cycles are displayed. Since the NTSC format has an interlace structure, in FIG. 19, a line denoted by A is a display start line of a top field. Likewise, a line denoted by B is a display start line of a bottom field. In other words, the display start line is a line start position in the spatially vertical direction of an MPEG decoded picture. The display start line of a bottom field is spatially lower than the display start line of a top field by one line. In FIG. 19, C represents a field in which an MPEG decoded frame starts. Information of the display start lines A and B and the display start field C is contained in the control information Ic. The display start field C is represented by an indicator of one bit.

As with the case shown in FIG. 19, FIG. 20 shows the case that an MPEG decoded picture with TFF=1 and RFF=0 is transmitted. However, unlike with the case shown in FIG. 19, top fields and bottom fields are transmitted in even cycles and odd cycles, respectively. In the MPEG format, since the relation among top fields, bottom fields, odd cycles, and even cycles has not been defined, the top fields and the bottom fields may be transmitted as shown in FIG. 19 or FIG. 20. In FIG. 20, a line denoted by A is a display start line of a top field. A line denoted by B is a display start line of a bottom field. C represents a field in which a frame of an MPEG decoded picture starts. As are clear from FIGS. 19 and 20, each of the display start lines A and B shown in FIG. 20 is spatially higher than those shown in FIG. 19 by one line. The phase of the display start field C shown in FIG. 19 is different from that shown in FIG. 20 by one field. With an indicator corresponding to the display start field C, the re-encoder side knows the temporal relation of pixels to be encoded.

FIG. 21 shows an example of the temporal relation between an MPEG decoded picture of which the 2:3 pull-down process (see FIG. 18) has been performed and a transmission picture format. In FIG. 21, there are four combinations of the flags TFF and RFF. In FIG. 21, top fields and bottom fields of an MPEG decoded picture with TFF=1 and RFF=0 are transmitted in odd cycles and even cycles, respectively. Next, an MPEG decoded picture with TFF=1 and RFF=1 is transmitted. Thereafter, an MPEG decoded picture with TFF=0 and RFF=1 is transmitted.

In FIG. 21, a line denoted by A is a display start line of a top field. A line denoted by B is a display start line of a bottom field. The display start line of a bottom field is spatially lower than the display start line of a top field by one line. As a display start field of a frame of an MPEG decoded picture, there are four indicators corresponding to the above-described four combinations of the flags. C1 represents a field in which an MPEG decoded frame with TFF=1 and RFF=0 starts. C2 represents a field in which an MPEG decoded frame with TFF=1 and RFF=1 starts. C3 represents a field in which an MPEG decoded field with TFF=0 and RFF=0 starts. C4 represents a field in which an MPEG decoded frame with TFF=0 and RFF=1 starts. Information of the display start lines A and B and the display start fields C1 to C4 is contained in the control information 1c.

Next, a process according to an embodiment of the present invention will be further described. The multiplexer 102 converts an MPEG decoded frame into a transmission picture signal (moving picture signal) corresponding to the above-described control information Ic and encoding feature point information Ip. In this case, the control information Ic and the encoding feature point information Ip are transmitted to the encoder side along with the transmission picture signal. However, it is not always necessary to transmit the flags TFF and RFF contained in the encoding feature point information Ip to the encoder side. To transmit the control information Ic and the encoding feature point information Ip, they are placed in a blank area such as a blanking interval of a picture signal.

On the re-encoder side, the demultiplexer 104 extracts the control information Ic and the encoding feature point information Ip and re-encodes an input picture signal corresponding to the extracted control information Ic and encoding feature point information Ip. In reality, the MPEG encoder 105 detects a temporal display start field of an MPEG decoded picture in the transmission picture signal. In addition, the MPEG encoder 105 detects a display start line number of each field of the MPEG decoded picture of the transmission picture signal. Moreover, the MPEG encoder 105 detects a spatially horizontal picture start position of the MPEG decoded picture in the transmission picture signal. In addition, the MPEG encoder 105 detects the picture encoding type of the MPEG decoded picture corresponding to the encoding feature point information Ip.

The MPEG encoder 105 generates an encoding target frame with a temporal display start field of the MPEG decoded picture in the transmission picture signal and the next field and extracts macro blocks. With such processes, when an input picture is encoded, the picture encoding type of a picture to be encoded can be matched with that of the original bit stream. In addition, the spatial area of the picture to be encoded can be matched with that of the original bit stream. Thus, the deterioration of the picture quality due to mismatches of picture encoding types, frame structures, and boundaries of macro blocks in the decoding process and the re-encoding process can be minimized.

When the flags TFF and RFF as the encoding feature point information Ip are transmitted to the encoder side, an encoded frame may be formed corresponding to these flags. In other words, when RFF=0, an encoded frame is formed with a temporal display start field of an MPEG decoded picture in a transmission picture signal and the next field. On the other hand, when RFF=1, an encoded frame is formed with a temporal display start field of an MPEG decoded picture in a transmission picture signal and the next field F. A field preceded by the field F is removed and thereby not encoded.

As described above, the encoding feature point information Ip may contain a temporal-reference (abbreviated as TPR) and the number of MPEG decoded frames (abbreviated as NUMi) from the first I picture to the next I picture along with the picture encoding type and the flags TFF and RFF. The TPR represents a display order number of an MPEG decoded frame. The TPR is reset every GOP. The TPR of an MPEG decoded frame that is first displayed in a GOP is zero. The NUMi is preferably transmitted in the same field as the indicator of a display start field of an I frame of a transmission picture. The control information Ic is the same as the above-described information Ic.

Now, it is assumed that I0, B1, B2, P3, B4, B5, P6, B7, B8, P9/I0, B1, B2, P3, B4, B5, P6, B7, B8, and P9/pictures are input to the MPEG encoder 105 that performs a re-encoding process. These pictures are the same as those shown in FIG. 13C. In this example, information of NUMi=10 is transmitted. "/" represents a boundary of GOPs. Suffixes represent display order numbers of MPEG decoded pictures in the current GOP. The suffixes match the TPRs of the encoded pictures of the encoded bit stream.

The decoder side preferably transmits the flag TPR to the re-encoder side along with the transmission picture signal. With the flag TPR, the re-encoder side detects the number of decoded pictures transmitted until the next I picture is received. The flag TPR is placed in a blank area such as a blanking interval along with the encoding feature point information.

The re-encoder side detects a temporal display start field of an MPEG decoded picture in a transmission picture signal. In addition, the re-encoder side detects a display start line number of a top field of the MPEG decoded picture in the transmission picture. Moreover, the re-encoder side detects a start position in the temporally horizontal direction of the MPEG decoded picture in the transmission picture signal. In addition, the re-encoder side detects whether or not an MPEG decoded picture is an I picture corresponding to the encoding feature point information Ip.

Thus, the MPEG encoder 105 causes a picture that is encoded as an I picture to match that of the original bit stream. Consequently, input MPEG decoded pictures can be re-encoded in the same spatial and temporal relations as the original bit stream.

The transmission picture signal may be an analog signal rather than a digital signal. In this case, the spatially horizontal pixel start position of an MPEG decoded picture in a transmission picture signal cannot be defined with a pixel number. Thus, it may be difficult to precisely transmit a signal from the decoder to the re-encoder side. However, even in this case, a picture signal can be re-encoded with high picture quality.

In more reality, the present invention can be applied to a picture signal recording/reproducing apparatus (shown in FIG. 6) that converts and compresses an input analog picture signal into a digital picture signal or compresses an input digital picture signal and records the compressed picture signal to an optical disc as a record medium, decompresses the compressed digital picture signal recorded on the optical disc, and reproduces the decompressed digital picture signal.

As described above, according to the present invention, when a picture signal is re-encoded, as a representative value of encoding parameters of an input encoded picture signal, the number of encoded bits and/or an average quantizing scale is generated. The input encoded picture signal is decoded and thereby a decoded picture signal is generated. Along with the generated decoded picture signal, the encoding parameters are output. With the encoding parameters, the decoded picture signal is encoded. Thus, the encoding parameters such as the number of encoded bits and the average quantizing scale used in the re-encoding process can be matched with those used in the first encoding process. Consequently, the number of encoded bits in the re-encoding process can be matched with that in the first encoding process.

Generally, the rate control in the encoding process depends on the encoding difficultness of a picture. Thus, the number of encoded bits varies. The variation of the number of encoded bits causes the picture quality in the re-encoding process to deteriorate. Consequently, in the above-described process for causing the number of encoded bits in the re-encoding process to be matched with that in the first encoding process, the deterioration of picture quality can be suppressed.

When the number of encoded bits in the re-encoding process is matched with that in the first encoding process, the deterioration of picture quality can be suppressed in the case that picture types thereof are matched but moving vectors thereof are not matched. In consideration of such a point, it is not necessary to cause a moving vector in the re-encoding process to match that in the first encoding process. Thus, the moving vector may not be transmitted depending on a required picture quality. In this case, the total number of bits for transmitting encoding parameters can be decreased. Consequently, the structure for data transmission can be simplified and the cost thereof can be reduced. Thus, the circuit structure of the entire apparatus can be simplified and the cost thereof can be reduced.

In addition, according to the present invention, in the case that data of which an inter-picture predictive encoding process for example an MPEG encoding process has been performed is decoded, the decoded picture signal is transmitted as a transmission picture signal, and the transmission picture signal is re-encoded, the re-encoder side can allow the temporal and spatial relations of the picture in the first encoding process to match those in the re-encoding process. Thus, the deterioration of picture quality due to the decoding process and re-encoding process can be minimized.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A picture signal processing system, comprising:
   a decoder for generating a number of encoded bits and/or an average quantizing scale as representative value(s) of encoding parameters of an input encoded picture signal, decoding the input encoded picture signal to generate a decoded picture signal, and outputting the encoding parameters along with the generated decoded picture signal; and
   an encoder for re-encoding the decoded picture signal using the same type of encoding as in said input encoded picture signal, using the encoding parameters to form a re-encoded picture signal, in which encoding parameters of the re-encoded picture signal are matched with those of the encoded picture signal, whereby the number of encoded bits of the re-encoded picture signal is at least substantially matched with that of the input encoded picture signal and deterioration of picture quality due to said re-encoding is suppressed.

2. The picture signal processing system as set forth in claim 1,
   wherein said decoder outputs a picture type and/or a moving vector along with the decoded picture signal in addition to the number of encoded bits and/or average quantizing scale as the encoding parameters.

3. The picture signal processing system as set forth in claim 1,
   wherein said decoder outputs encoding parameters used in a picture encoding process along with the decoded picture signal for each picture.

4. The picture signal processing system as set forth in claim 1,
   wherein said decoder outputs encoding parameters used in a picture encoding process along with the decoded picture signal for each slice.

5. The picture signal processing system as set forth in claim 1,
   wherein said encoder performs a rate control corresponding to the number of encoded bits and/or average quantizing scale.

6. The picture signal processing system as set forth in claim 1, wherein said encoder re-encodes an unmodified version of the decoded picture signal.

7. The picture signal processing system as set forth in claim 2, wherein said decoder outputs both said picture type and said moving vector along with the decoded picture signal in addition to the number of encoded bits and/or average quantizing scale as the encoding parameters.

8. The picture signal processing system as set forth in claim 2, wherein said decoder outputs only said picture type along with the decoded picture signal in addition to the number of encoded bits and/or average quantizing scale as the encoding parameters.

9. The picture signal processing system as set forth in claim 1, further comprising:
   a multiplexer for multiplexing the decoded picture signal with the encoding parameters to form a multiplexed signal; and
   a demultiplexer for demultiplexing the multiplexed signal to recover said decoded picture signal and said encoding parameters, and outputting the recovered decoded picture signal and encoding parameters to said encoder which performs the re-encoding of the recovered decoded picture signal using the encoding parameters output by the demultiplexer.

10. The picture signal processing system as set forth in claim 9, wherein said multiplexing is performed by placing the encoding parameters in header information of said decoded picture signal.

11. The picture signal processing system as set forth in claim 9, further comprising:
   means for recording the multiplexed signal on a record medium; and
   means for reproducing the multiplexed signal from the record medium;
   wherein said demultiplexer demultiplexes the reproduced multiplexed signal to recover said decoded picture signal and said encoding parameters.

12. A decoder, comprising:

encoding parameter generating means for generating a number of encoded bits and/or an average quantizing scale as representative value(s) of encoding parameters of an input encoded picture signal; and decoding means for decoding the input encoded picture signal to generate a decoded picture signal, wherein the encoding parameters generated by said encoding parameter generating means are output along with the generated decoded picture signal generated by said decoding means, whereby the output of said encoding parameters with the decoded picture signal enables said decoded picture to be subsequently re-encoded using the same type of encoding as in said input encoded picture signal, to form a re-encoded picture in which encoding parameters of the re-encoded picture signal are matched with those of the encoded picture signal, whereby the number of encoded bits of the re-encoded picture signal is at least substantially matched with that of the input encoded picture signal and deterioration of picture quality due to the re-encoding is suppressed.

13. The decoder as set forth in claim 12, wherein said encoding parameter generating means generates a picture type and/or a moving vector along with the number of encoded bits and/or an average quantizing scale as representative values of the encoding parameters.

14. The decoder as set forth in claim 12, wherein the encoding parameters generated by said encoding parameter generating means are used in the picture encoding process for each picture.

15. The decoder as set forth in claim 12, wherein the encoding parameters generated by said encoding parameter generating means are used in the picture encoding process for each slice.

16. The picture signal processing system as set forth in claim 12, further comprising a multiplexer for multiplexing the decoded picture signal with the encoding parameters to form a multiplexed signal, wherein said encoding parameters and said decoded picture signal are output as said multiplexed signal.

17. A picture signal processing method, comprising the steps of:

generating a number of encoded bits and/or an average quantizing scale as representative value(s) of encoding parameters of an input encoded picture signal;

decoding the input encoded picture signal to generate a decoded picture signal;

outputting the encoding parameters along with the generated decoded picture signal; and re-encoding the decoded picture signal using the same type of encoding as in said input encoded picture signal, using the encoding parameters to form a re-encoded picture signal, in which encoding parameters of the re-encoded picture signal are matched with those of the encoded picture signal, whereby the number of encoded bits of the re-encoded picture signal is at least substantially matched with that of the input encoded picture signal and deterioration of picture quality due to said re-encoding is suppressed.

18. The picture signal processing method as set forth in claim 17, wherein said outputting further includes outputting a picture type and/or a moving vector along with the decoded picture signal in addition to the number of encoded bits and/or average quantizing scale as the encoding parameters.

19. The picture signal processing method as set forth in claim 17, further comprising:

multiplexing the decoded picture signal with the encoding parameters to form a multiplexed signal, wherein said encoding parameters and decoded picture signal are output as a multiplexed signal; and demultiplexing the multiplexed signal to recover said decoded picture signal and said encoding parameters, wherein said recovered decoded picture signal is re-encoded in said re-encoding step using the recovered encoding parameters.

20. The picture signal processing method as set forth in claim 17, wherein said re-encoding is performed on an unmodified version of the decoded picture signal.

21. A decoding method, comprising the steps of:

generating a number of encoding bits and/or an average quantizing scale as representative values of encoding parameters of an input encoded picture signal;

decoding the input encoded picture signal to generate a decoded picture signal; and outputting the encoding parameters along with the decoded picture signal;

whereby the outputting of said encoding parameters with the decoded picture signal enables said decoded picture to be subsequently re-encoded using the same type of encoding as in said input encoded picture signal, to form a re-encoded picture in which encoding parameters of the re-encoded picture signal are matched with those of the encoded picture signal, whereby the number of encoded bits of the re-encoded picture signal is at least substantially matched with that of the input encoded picture signal and deterioration of picture quality due to the re-encoding is suppressed.

22. The picture signal processing method as set forth in claim 21, wherein said outputting further includes outputting a picture type and/or a moving vector along with the decoded picture signal in addition to the number of encoded bits and/or average quantizing scale as the encoding parameters.

23. The picture signal processing method as set forth in claim 21, further comprising multiplexing the decoded picture signal with the encoding parameters to form a multiplexed signal, wherein said encoding parameters and decoded picture signal are output as said multiplexed signal.

* * * * *